United States Patent
Yang

(10) Patent No.: US 11,307,776 B2
(45) Date of Patent: Apr. 19, 2022

(54) METHOD FOR ACCESSING DISTRIBUTED STORAGE SYSTEM, RELATED APPARATUS, AND RELATED SYSTEM

(71) Applicant: HUAWEI TECHNOLOGIES CO., LTD., Guangdong (CN)

(72) Inventor: Dingguo Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 72 days.

(21) Appl. No.: 16/574,421

(22) Filed: Sep. 18, 2019

(65) Prior Publication Data

US 2020/0012442 A1    Jan. 9, 2020

Related U.S. Application Data

(63) Continuation of application No. PCT/CN2017/078579, filed on Mar. 29, 2017.

(51) Int. Cl.
G06F 3/06 (2006.01)

(52) U.S. Cl.
CPC ............ G06F 3/0622 (2013.01); G06F 3/067 (2013.01); G06F 3/0653 (2013.01)

(58) Field of Classification Search
CPC ....... G06F 3/0622; G06F 3/067; G06F 3/0653
USPC ....................................................... 711/163
See application file for complete search history.

(56) References Cited

U.S. PATENT DOCUMENTS

| 6,952,737 | B1* | 10/2005 | Coates | G06F 3/0607 |
| | | | | 709/229 |
| 2004/0039928 | A1 | 2/2004 | Elbe et al. | |
| 2012/0117325 | A1 | 5/2012 | Chen et al. | |
| 2013/0097402 | A1 | 4/2013 | Bao et al. | |
| 2015/0186214 | A1 | 7/2015 | Gladwin et al. | |
| 2015/0324371 | A1* | 11/2015 | Guo | G06F 16/182 |
| | | | | 707/693 |
| 2017/0160968 | A1 | 6/2017 | Hashimoto et al. | |
| 2017/0237563 | A1* | 8/2017 | El-Moussa | G06F 3/0659 |
| | | | | 713/193 |
| 2017/0251073 | A1* | 8/2017 | Raghunath | G06F 12/0888 |

FOREIGN PATENT DOCUMENTS

| CN | 101615145 A | 12/2009 |
| CN | 102111448 A | 6/2011 |
| CN | 104951475 A | 9/2015 |
| CN | 105009085 A | 10/2015 |
| CN | 106406758 A | 2/2017 |
| JP | 2004192305 A | 7/2004 |
| JP | 2010503941 A | 2/2010 |
| WO | 2016065613 A1 | 5/2016 |

* cited by examiner

*Primary Examiner* — Hua J Song

(74) *Attorney, Agent, or Firm* — Leydig, Voit & Mayer, Ltd.

(57) ABSTRACT

In a distributed storage system, a first storage node receives a first data read request for reading first data. The first data request includes a first address of the first data. The first storage node determines that the first data are stored in a first storage device included in the first storage node based on the first address. Based on the determination, the first storage node checks whether the first storage device is in a trusted access state. Further, the first storage node obtains the first data when the first storage device is in the trusted access state.

8 Claims, 16 Drawing Sheets

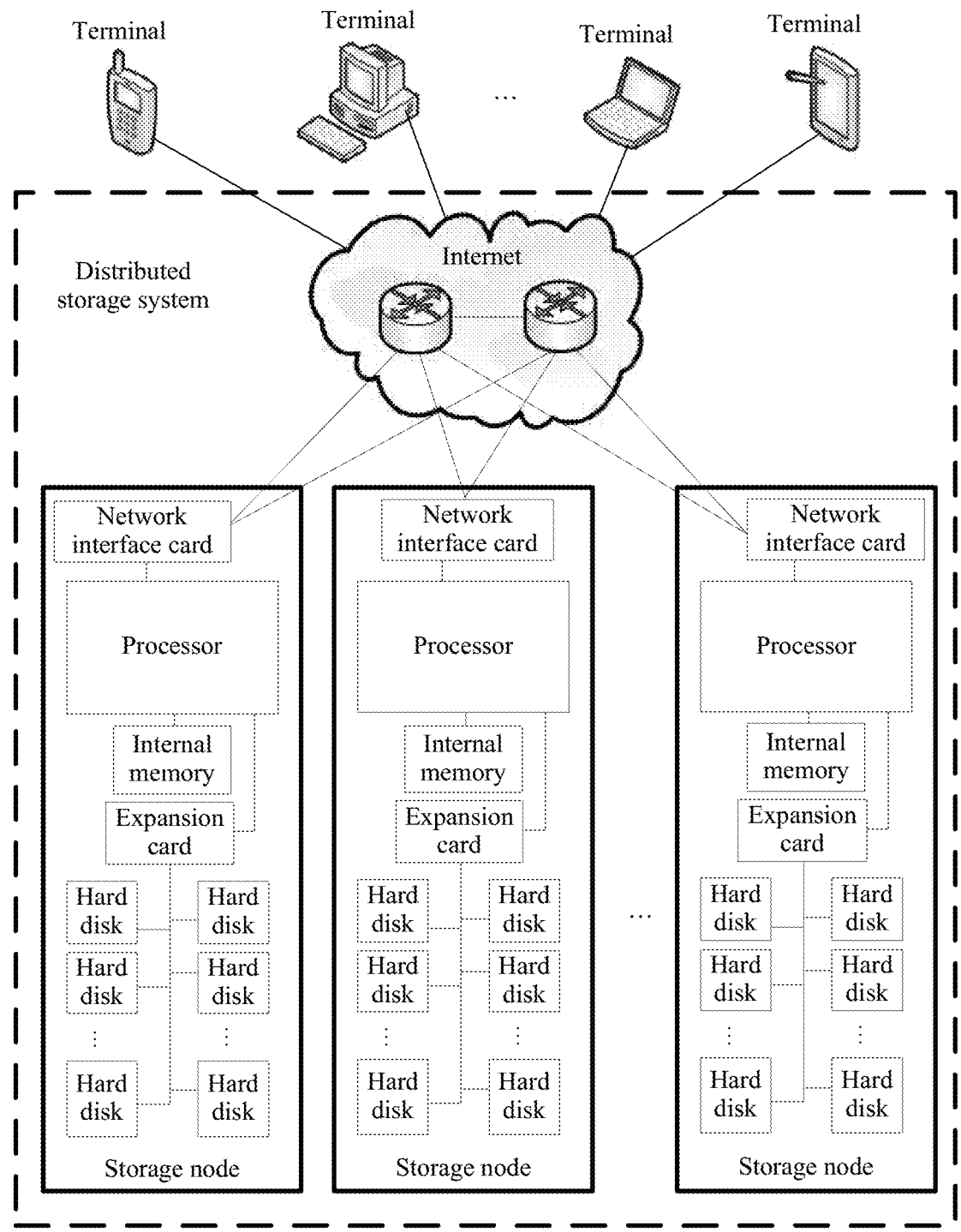
FIG. 1-A

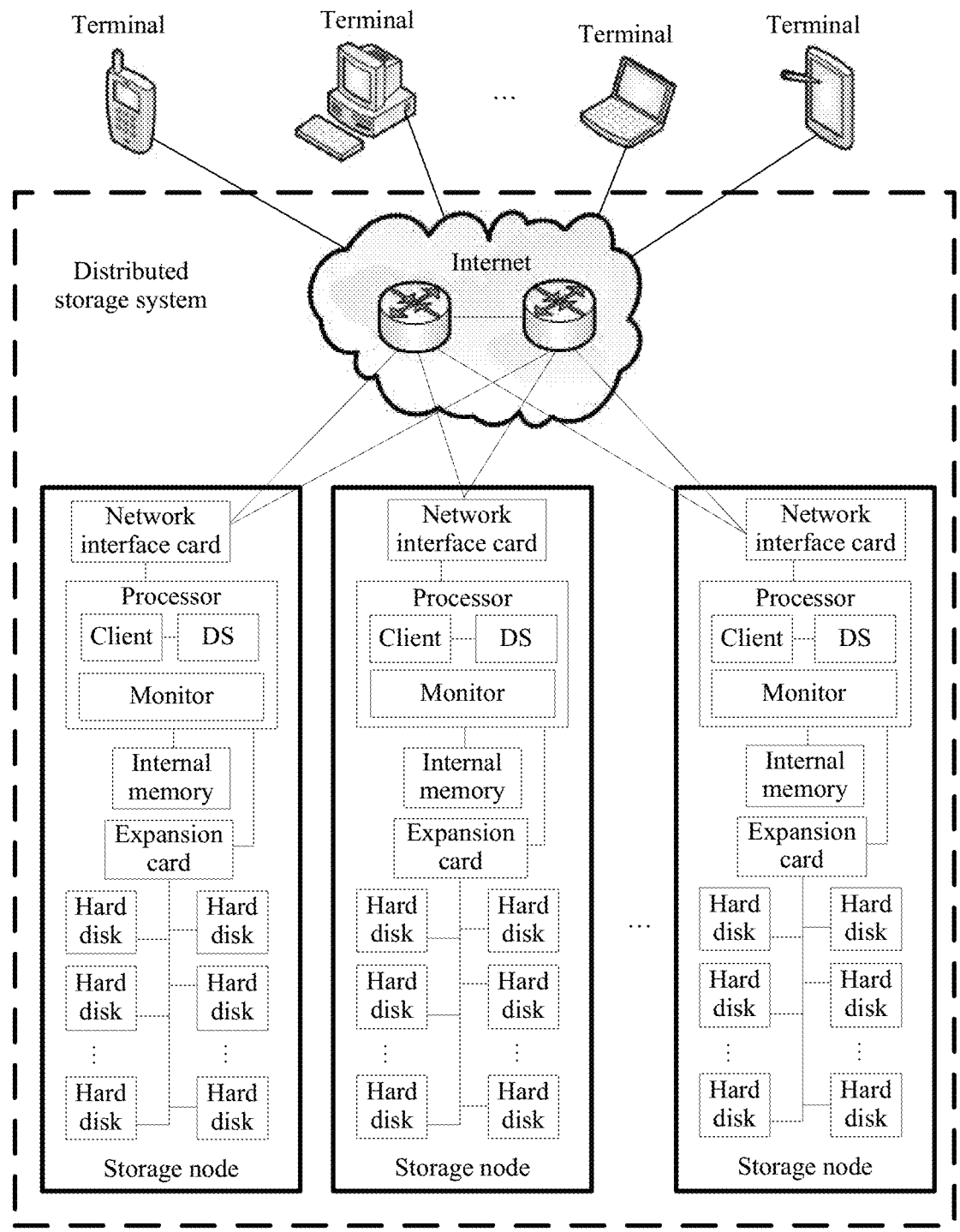
FIG. 1-B

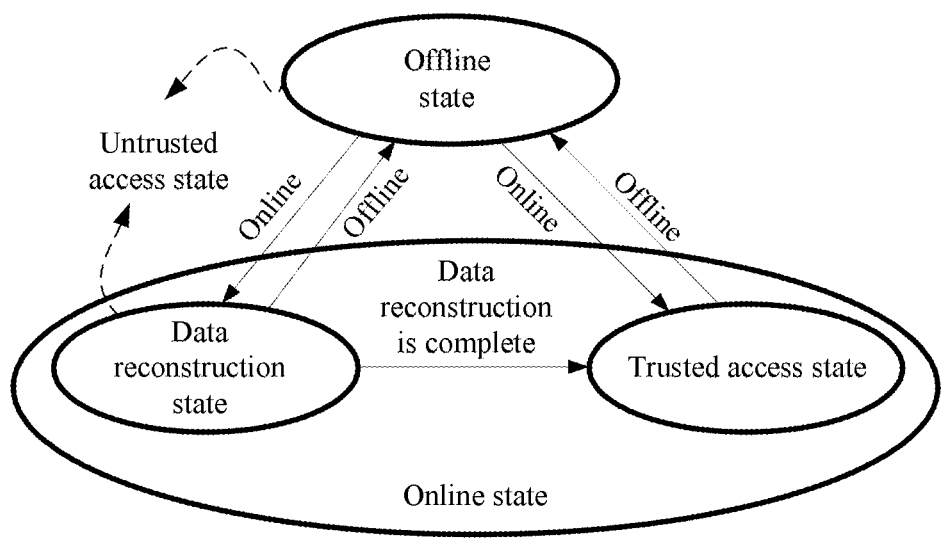
FIG. 1-C
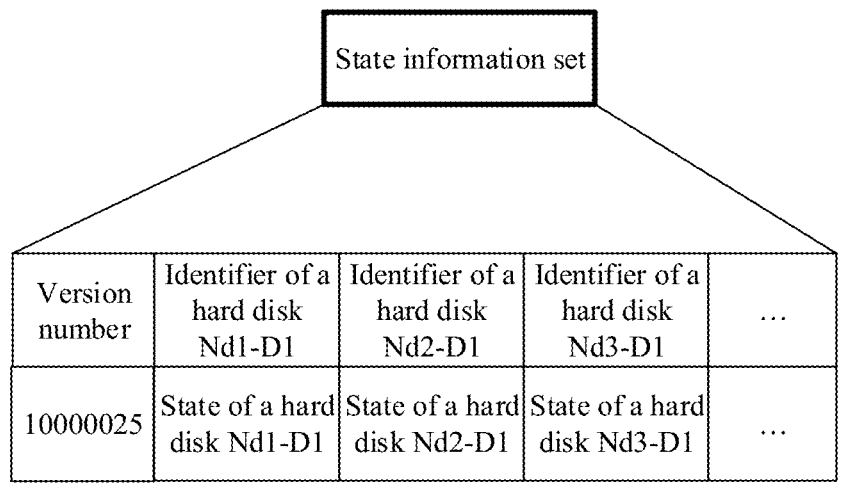
FIG. 1-D
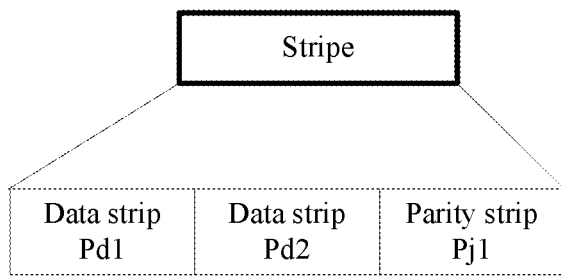
FIG. 1-E

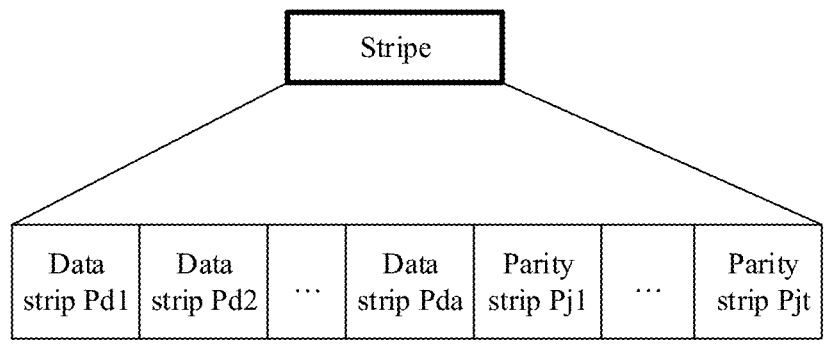
FIG. 1-F
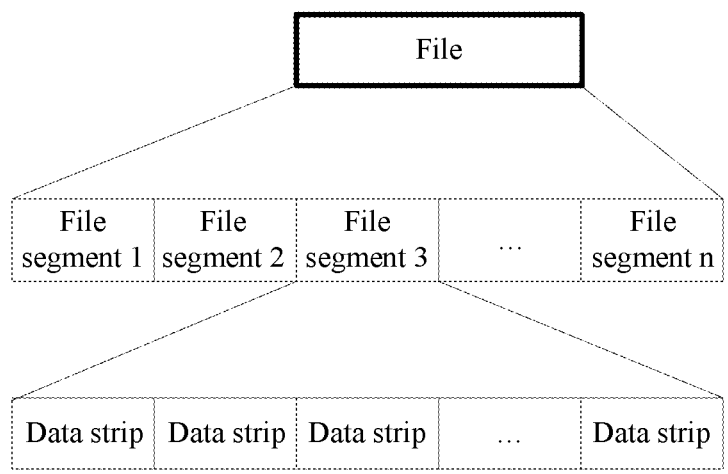
FIG. 2-A
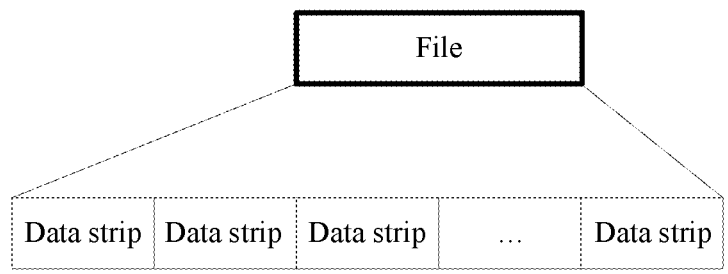
FIG. 2-B

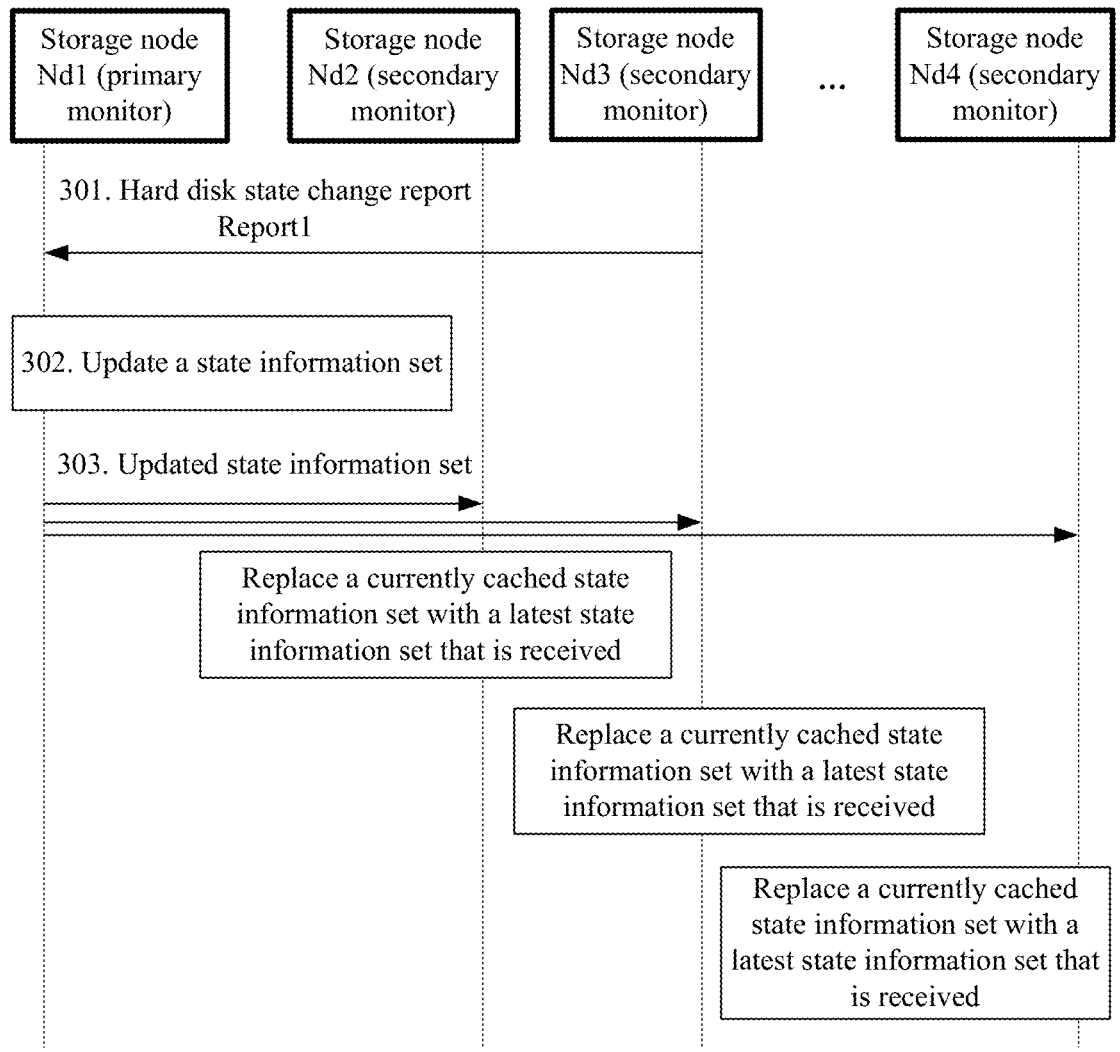
FIG. 3-A
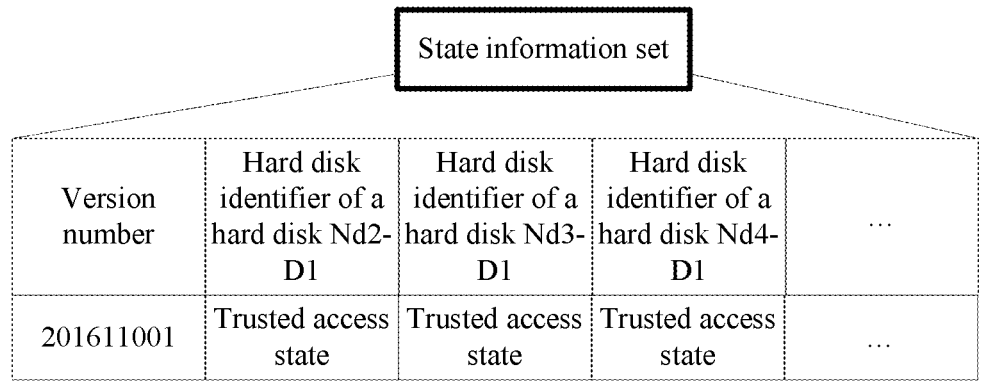
FIG. 3-B

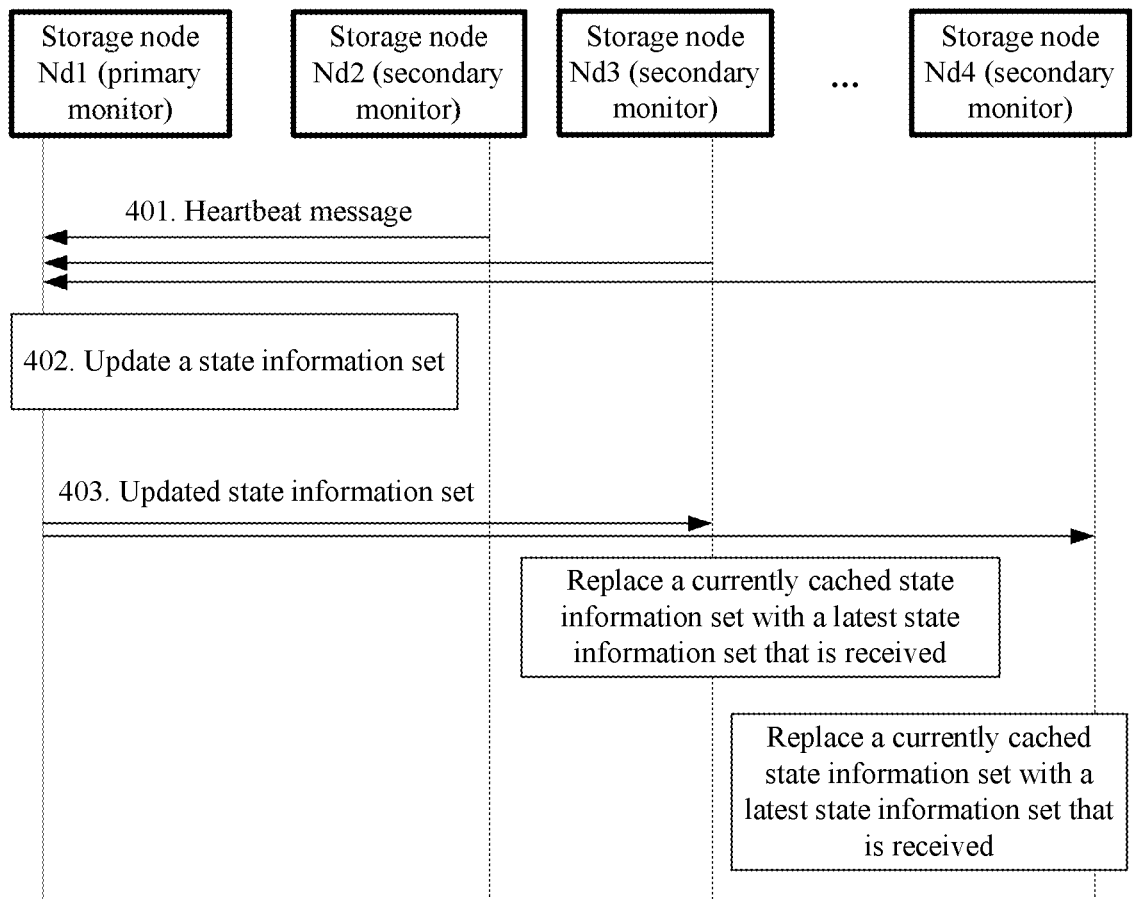
FIG. 3-C
FIG. 4-A

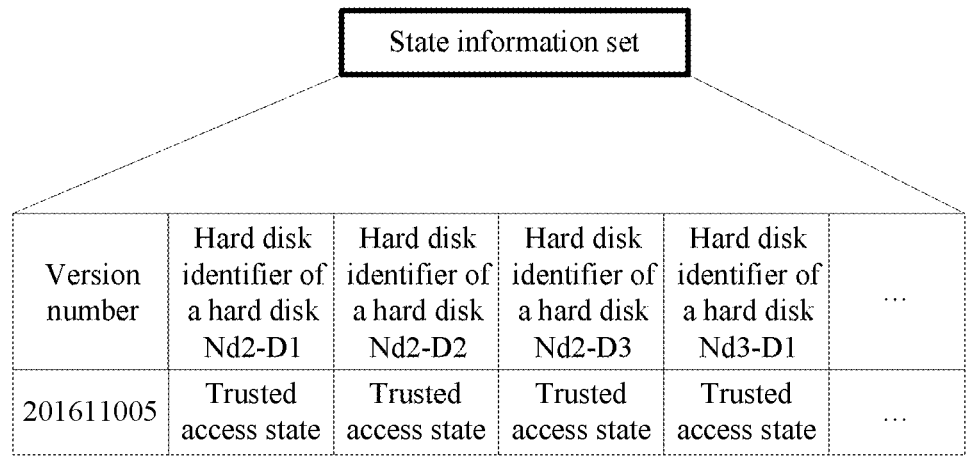
FIG. 4-B
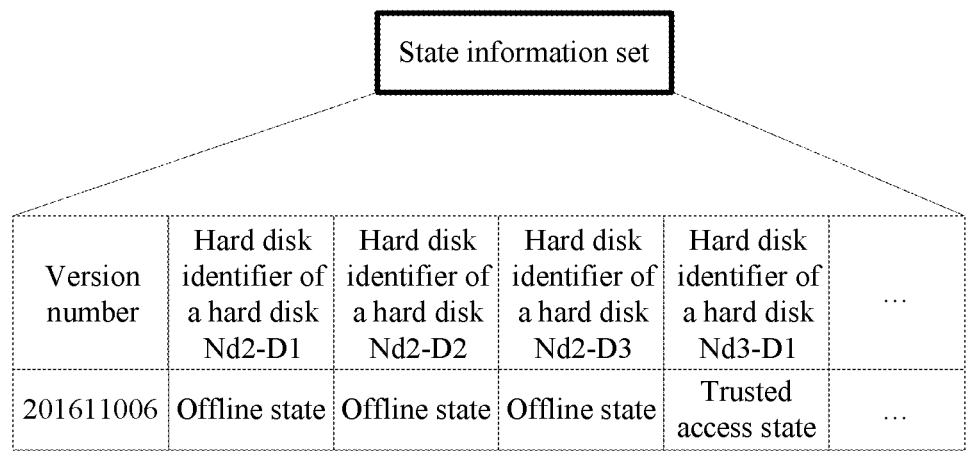
FIG. 4-C

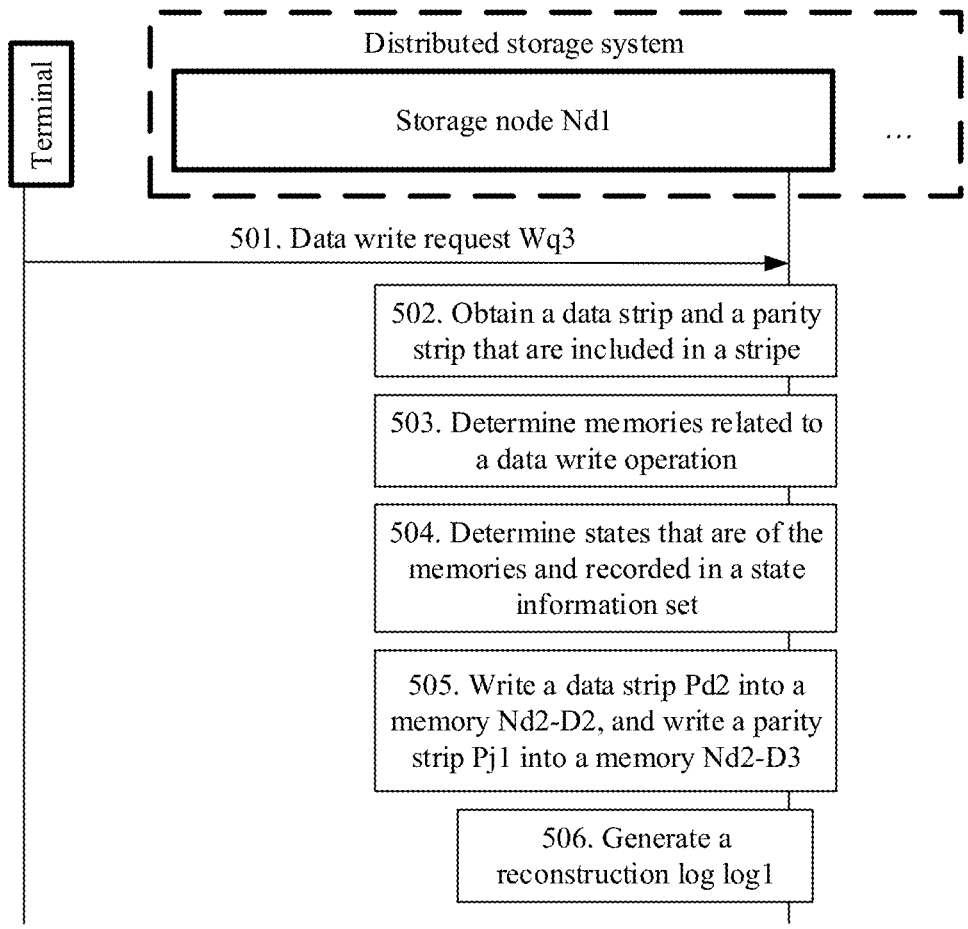
FIG. 5-A
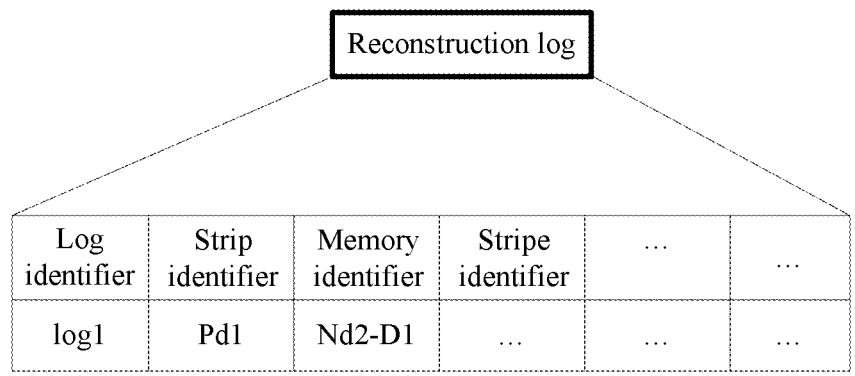
FIG. 5-B

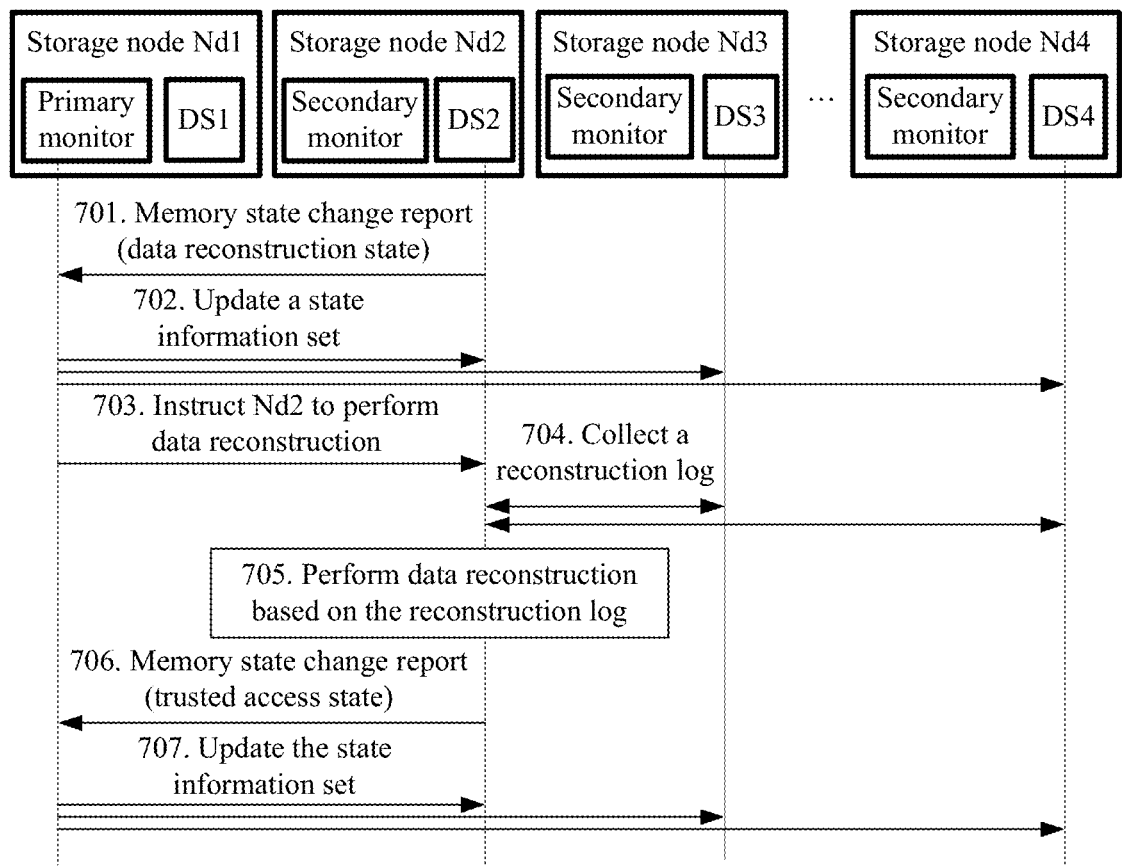
FIG. 7-A
FIG. 7-B

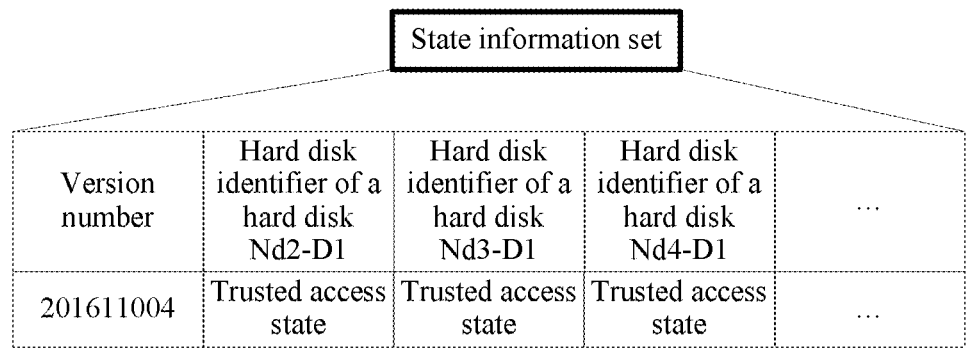
FIG. 7-C

METHOD FOR ACCESSING DISTRIBUTED STORAGE SYSTEM, RELATED APPARATUS, AND RELATED SYSTEM

CROSS-REFERENCE TO RELATED APPLICATIONS

This application is a continuation of International Application No. PCT/CN2017/078579, filed on Mar. 29, 2017, is hereby incorporated by reference in its entirety.

TECHNICAL FIELD

This application relates to the field of computer technologies, and specifically, relates to a method for accessing a distributed storage system, a related apparatus, and a related system.

BACKGROUND

A conventional network storage system uses a centralized storage server to store all data. In such an architecture, the storage server becomes a system performance bottleneck and a weakness in reliability and security, and it is difficult to meet a requirement of a large-scale storage application. In a distributed storage system, data is stored on a plurality of separate devices (that is, storage nodes) in a decentralized manner. The distributed storage system uses a scalable system structure, and uses a plurality of storage nodes to share storage load. The distributed storage system helps improve system reliability, availability, access efficiency, and scalability.

As a storage capacity continuously increases, quantities of storage nodes and hard disks in a distributed storage system also increase. A growing quantity of distributed storage systems use an erasure code (EC) technology to decentralize data for storage on different hard disks, to improve data reliability. While ensuring system reliability, the EC technology can further improve system performance effectively. Certainly, in addition to the EC technology, another similar redundancy check technology may also be used in the distributed storage system.

A stripe (for example, an EC stripe) includes a plurality of strips, and specifically, may include N data strips and M parity strips (for example, two data strips and one parity strip). The M parity strips are obtained by means of calculation based on the N data strips. A length of the data strip may be up to 1 Mb. In a conventional technology, even though target data to be read in a read operation occupies only a small fraction of a stripe, all data strips and parity strips in the stripe to which the target data belongs need to be read in each read operation, so that a data correctness check can be performed, thereby ensuring correctness of the target data. However, a length of the stripe is usually large, and consequently, in a scenario such as random read, load of a hard disk is increased, and system performance is greatly reduced.

SUMMARY

Embodiments of this application provide a data access method, and a related apparatus and system.

According to a first aspect, an embodiment of this application provides a data read method. The method is applied to a distributed storage system including m storage nodes, each storage node includes at least one memory (the memory may be, for example, a hard disk, or a memory in another form), and m is an integer greater than 1. The method may include the following steps: For example, when a terminal needs to request to read first data from the distributed storage system, a first storage node in the m storage nodes may receive a first data read request from the terminal, where the first data read request carries first location information, and the first location information is used to describe a location of the first data in a data body to which the first data belongs. If the first storage node determines, based on the first location information, that a memory in which the first data is located is a first memory, and the first memory belongs to the first storage node, the first storage node determines a state (the first memory may be, for example, in a trusted access state or an untrusted access state) that is of the first memory and currently recorded in a state information set (a state information set cached by the first storage node). When it is determined that the first memory is in a trusted access state, the first storage node reads the first data from the first memory. The first storage node sends a first data read response used for responding to the first data read request to the terminal, where the first data read response carries the read first data, and the first data is a part or all of data in a strip to which the first data belongs.

The data body in the embodiments of this application may be, for example, a file, an object, a file segment, a database record, a data segment, or the like.

The state information set in the embodiments of this application is used to record a state of a hard disk, and the like, and a format of the state information set may be, for example, a file or another data format. If the format of the state information set is a file, the state information set may also be referred to as a "status file".

It can be learned that, in the foregoing solution, the state information set used for recording a memory state is introduced into the distributed storage system, and therefore the state information set may be used to record and manage access states of the memories in the distributed storage system. For a memory that is recorded as being in a trusted access state in the state information set, requested data can be directly read from the memory and fed back to the terminal. In such a case of trusted access, complex steps in a conventional manner of reading all strips of a related stripe and then performing a correctness check are not required, and a data read amount is reduced, thereby helping reduce memory load and further helping improve system performance.

In addition, in some possible implementations of this application, before the first storage node determines the state that is of the first memory and currently recorded in the state information set, the first storage node may first determine whether the state information set has been cached; and if the state information set has been cached, the first storage node may determine the state that is of the first memory and currently recorded in the cached state information set, or if the state information set has not been cached, and the first storage node and a management node that is configured to release a state information set are in a connected state, the first storage node first obtains the state information set from the management node for caching, and then determines the state that is of the first memory and currently recorded in the cached state information set.

In addition, in some possible implementations of this application, before the first storage node determines the state that is of the first memory and currently recorded in the state information set, the first storage node may first determine whether the state information set has been cached; and if the state information set has been cached, the first storage node may determine whether duration for which the cached state information set has been obtained exceeds a duration threshold (the duration threshold may be, for example, 2 minutes, 10 minutes, or 30 minutes; generally, longer duration for which a currently cached state information set has been obtained indicates a higher probability of invalidity of the state information set). If the duration for which the cached state information set has been obtained exceeds the duration threshold, and the first storage node and a management node that is configured to release a state information set are in a connected state, the first storage node first obtains the state information set from the management node, uses a latest obtained state information set to update the previously cached state information set, and then determines the state that is of the first memory and currently recorded in the cached state information set. If the duration for which the cached state information set has been obtained does not exceed the duration threshold, or the first storage node and a management node that is configured to release a state information set are not in a connected state, the first storage node determines the state that is of the first memory and currently recorded in the cached state information set.

In addition, in some possible implementations of this application, the method may further include the following steps: If the first memory belongs to a second storage node in the m storage nodes, it is determined that the first memory is in a trusted access state (specifically, for example, the first storage node determines, based on the state information set, that the first memory is in a trusted access state, that is, the state information set cached by the first storage node records that the first memory is in a trusted access state), and the first storage node and a management node that is configured to release a state information set are in a connected state (When the first storage node and the management node that is configured to release a state information set are in a connected state, there is a relatively high probability that the state information set cached by the first storage node is a latest state information set released by the management node, and therefore there is a relatively high probability that the state information set currently cached by the first storage node is currently valid. Therefore, it may be considered that, there is a very high probability that a case in which the first storage node determines, based on the cached state information set, that the first memory is in a trusted access state accords with an actual situation of the first memory), the first storage node forwards the first data read request to the second storage node. After receiving the first data read request from the first storage node, the second storage node reads the first data from the first memory, and sends the first data read response used for responding to the first data read request to the first storage node or the terminal, where the first data read response carries the read first data.

In some possible implementations of this application, the method may further include the following steps: If the first memory belongs to a second storage node in the m storage nodes, and the first memory is in a trusted access state (specifically, for example, the state information set currently cached by the first storage node records that the first memory is in a trusted access state), or if the first memory belongs to a second storage node in the m storage nodes, the first memory is in a trusted access state, and the first storage node and a management node that is configured to release a state information set are in a connected state (when the first storage node and the management node are in a connected state, there is a very high probability that the first storage node obtains a latest state information set released by the management node), the first storage node may add, into the first data read request, an identifier of the state information set currently cached by the first storage node, and send, to the second storage node, the first data read request into which the identifier of the state information set is added.

After receiving the first data read request from the first storage node, the second storage node may compare the identifier of the state information set carried in the first data read request with an identifier of a state information set currently cached by the second storage node, and if it is determined by comparison that the identifier of the state information set carried in the first data read request is the same as the identifier of the state information set currently cached by the second storage node (When the identifier of the state information set carried in the first data read request is the same as the identifier of the state information set currently cached by the second storage node, it indicates that the first storage node and the second storage node currently cache the same state information set, and in this case, there is a very high probability that the state information set currently cached by the first storage node is currently valid. In this case, if the first storage node and the management node are in a connected state, the probability that the state information set currently cached by the first storage node is currently valid further increases. Therefore, there is a very high probability that a case in which the first storage node determines, based on the state information set currently cached by the first storage node, that the first memory is in a trusted access state accords with an actual situation of the first memory), read the first data from the first memory, and send the first data read response used for responding to the first data read request to the first storage node or the terminal, where the first data read response carries the read first data.

In the embodiments of this application, the identifier of the state information set includes, for example, a version number of the state information set, and/or a data digest of the state information set. It may be understood that, an identifier of a state information set of a version may be specifically any information that can represent the state information set of this version. The version number and/or the data digest of the state information set are/is merely possible examples of the identifier of the state information set.

Generally, a role of the management node is taken by a particular node (for example, a particular storage node in the distributed storage system). However, in some special cases (for example, a current management node becomes faulty or does not have a sufficient processing capability), the storage node taking the role of the management node may also be allowed to change. For example, a storage node A takes the role of the management node in a time period (in this case, a node identifier of the management node is also a node identifier of the storage node A), but in another time period, the storage node A no longer takes the role of the management node and instead, a storage node B takes the role of the management node (in this case, the node identifier of the management node is a node identifier of the storage node B). That is, because a storage node taking the role of the management node may change in some special cases, the node identifier of the management node (that is, a node identifier of the storage node taking the role of the management node) may change. Each storage node in the distributed storage system may cache a node identifier of a storage node that is currently considered as a latest management node, and when finding that the storage node taking the role of the management node changes, the storage node uses a node identifier of a latest management node found by the storage node to update the node identifier that is of the management node and previously cached by the storage node.

In some possible implementations of this application, the method may further include the following steps: When the first memory belongs to a second storage node in the m storage nodes, the first memory is in a trusted access state (specifically, for example, the state information set cached by the first storage node records that the first memory is in a trusted access state), and the first storage node and a management node that is configured to release a state information set are in a connected state, the first storage node adds, into the first data read request, a node identifier, currently cached by the first storage node, of a management node that is configured to release a state information set, and sends, to the second storage node, the first data read request into which the node identifier of the management node is added.

If the second storage node receives the first data read request from the first storage node, or if the second storage node receives the first data read request from the first storage node, and the second storage node and the management node that is configured to release a state information set are in a connected state, the second storage node compares the node identifier of the management node carried in the first data read request with the node identifier that is of the management node and currently cached by the second storage node, and if it is determined by comparison that the node identifier of the management node carried in the first data read request is the same as the node identifier that is of the management node and currently cached by the second storage node (When the first storage node and the second storage node cache the same node identifier of the management node, it indicates that the first storage node and the second storage node consider a same storage node as the management node, and there is a very high probability that the storage node that is considered as the management node by both the first storage node and the second storage node is a currently latest management node in the distributed storage system. In this case, if the first storage node and the management node are in a connected state, there is a very high probability that the state information set cached by the first storage node is currently valid. Therefore, it may be considered that, there is a very high probability that a case in which the first storage node determines, based on the state information set cached by the first storage node, that the first memory is in a trusted access state accords with an actual situation of the first memory), reads the first data from the first memory, and sends the first data read response used for responding to the first data read request to the first storage node or the terminal, where the first data read response carries the read first data.

In some possible implementations of this application, the method may further include the following steps: If the first memory belongs to a second storage node in the m storage nodes, and the first memory is in a trusted access state (specifically, for example, the state information set cached by the first storage node records that the first memory is in a trusted access state), or if the first memory belongs to a second storage node in the m storage nodes, the first memory is in a trusted access state (for example, the state information set cached by the first storage node records that the first memory is in a trusted access state), and the first storage node and a management node that is configured to release a state information set are in a connected state, the first storage node adds, into the first data read request, an identifier of the state information set currently cached by the first storage node and a node identifier of the management node that is configured to release a state information set, and sends, to the second storage node, the first data read request into which the identifier of the state information set and the node identifier of the management node are added.

If the second storage node receives the first data read request from the first storage node, or if the second storage node receives the first data read request from the first storage node, and the second storage node and the management node that is configured to release a state information set are in a connected state, the second storage node compares the identifier of the state information set carried in the first data read request with an identifier of a state information set currently cached by the second storage node, compares the node identifier of the management node carried in the first data read request with the node identifier that is of the management node and currently cached by the second storage node, and if it is determined by comparison that the identifier of the state information set carried in the first data read request is the same as the identifier of the state information set currently cached by the second storage node, and it is determined by comparison that the node identifier of the management node carried in the first data read request is the same as the node identifier that is of the management node and currently cached by the second storage node (When the first storage node and the second storage node cache the same node identifier of the management node, it indicates that the first storage node and the second storage node consider a same storage node as the management node, and there is a very high probability that the storage node that is considered as the management node by both the first storage node and the second storage node is a currently latest management node in the distributed storage system. In this case, if the first storage node and the second storage node currently cache the same state information set, there is a very high probability that the state information set currently cached by the first storage node is currently valid. Further, if the first storage node and/or the first storage node and the management node are in a connected state, there is a higher probability that the state information set currently cached by the first storage node is currently valid. Therefore, there is a very high probability that a case in which the first storage node determines, based on the state information set currently cached by the first storage node, that the first memory is in a trusted access state accords with an actual situation of the first memory), reads the first data from the first memory, and sends the first data read response used for responding to the first data read request to the first storage node or the terminal, where the first data read response carries the read first data.

In some possible implementations of this application, the method further includes the following steps: If the first storage node determines that the first storage node is in an untrusted access state, the first storage node determines a stripe to which the first data belongs, and the first storage node determines N memories in which strips of the stripe are located.

If the N memories all belong to the first storage node, the first storage node reads the strips of the stripe from the N memories; and the first storage node performs, based on the read strips of the stripe, a check operation to obtain the first data (specifically, the first storage node first performs, based on the read strips of the stripe, the check operation to obtain the strip to which the first data belongs, and then obtains the first data from the strip to which the first data belongs), and sends the first data read response used for responding to the first data read request to the terminal, where the first data read response carries the obtained first data.

In some possible implementations of this application, when x memories (the x memories include the first memory) in the N memories in which the strips of the stripe to which the first data belongs are located belong to the first storage node, and N-x memories in the N memories belong to y storage nodes different from the first memory, the method may further include the following steps: If the first storage node determines that the first memory is in an untrusted access state, and determines that memories other than the first memory in the N memories are in a trusted access state (or if the first storage node determines that the first memory is in an untrusted access state, and determines that memories other than the first storage node in the N memories are in a trusted access state, and the first storage node and a management node that is configured to release a state information set are in a connected state), the first storage node sends, to the y storage nodes, a data read request that carries a stripe identifier of the stripe and an identifier of the state information set cached by the first storage node. Correspondingly, after receiving the data read request from the first storage node, each of the y storage nodes may compare the identifier of the state information set carried in the data read request with an identifier of a state information set currently cached by the storage node, and if it is determined by comparison that the identifier of the state information set carried in the data read request is the same as the identifier of the state information set currently cached by the storage node (When the identifier of the state information set carried in the data read request is the same as the identifier of the state information set currently cached by the storage node that receives the data read request, it indicates that the first storage node and the storage node that receives the data read request currently cache the same state information set, and in this case, there is a very high probability that the state information set currently cached by the first storage node is currently valid. In this case, if the first storage node and the management node are in a connected state, the probability that the state information set currently cached by the first storage node is currently valid further increases. Therefore, there is a very high probability that a case in which the first storage node determines, based on the state information set currently cached by the first storage node, that the first memory is in an untrusted access state accords with an actual situation of the first memory), read a corresponding strip of the stripe from a corresponding memory included in the storage node, and send the read corresponding strip of the stripe to the first storage node.

Correspondingly, the first storage node performs, based on strips (which do not include the strip to which the first data belongs) of the stripe that are collected from the y storage nodes and the first storage node, a check operation to obtain the first data, and sends the first data read response used for responding to the first data read request to the terminal, where the first data read response carries the obtained first data.

In some possible implementations of this application, one of the m storage nodes is the management node. The method may further include the following step: When a state of the first memory changes from a first state to a second state, the first storage node sends a memory state change report to the management node, where the memory state change report indicates that the first memory is in the second state, the first state is different from the second state, and the first state and the second state each include any one of the following states: an offline state, a data reconstruction state, or a trusted access state.

Correspondingly, after receiving the memory state change report from the first storage node, the management node may update a state that is of the first memory and recorded in a state information set cached by the management node into the second state, and update a version number of the state information set cached by the management node; and the management node sends an updated state information set to a storage node other than the management node in the m storage nodes.

Correspondingly, the first storage node uses the state information set from the management node to update the state information set currently cached by the first storage node.

In some possible implementations of this application, the method further includes the following steps: For example, when the terminal needs to request to write second data into the distributed storage system, the first storage node may receive a first data write request from the terminal, where the first data write request carries the second data and second location information, and the second location information is used to describe a location of the second data in a data body to which the second data belongs. The first storage node determines, based on the second location information, W memories related to writing the second data. The first storage node segments the second data into W-T data strips, and obtains T parity strips by means of calculation by using the W-T data strips. The T parity strips and the W-T data strips form a stripe including W strips, the W memories are in a one-to-one correspondence with the W strips, T and W are positive integers, and T is less than W.

The first storage node determines states that are of the W memories and currently recorded in the state information set cached by the first storage node, and when it is determined that W1 memories in the W memories are in a non-offline state (and, for example, W2 memories in the W memories are in an offline state), sends, to y2 storage nodes to which the W1 memories belong, a data write request that carries a strip of the stripe and the identifier of the state information set.

Correspondingly, after receiving the data write request from the first storage node, each of the y2 storage nodes compares the identifier of the state information set carried in the data write request with an identifier of a state information set currently cached by the storage node, and, for example, if it is determined by comparison that the identifier of the state information set carried in the data write request is the same as the identifier of the state information set currently cached by the storage node, writes a corresponding strip of the stripe into a corresponding memory included in the storage node, or if it is determined by comparison that the identifier of the state information set carried in the data write request is different from the identifier of the state information set currently cached by the storage node, refuses to write a corresponding strip of the stripe into a corresponding memory included in the storage node.

For another example, in some possible implementations of this application, the method may further include the following steps: For example, when the terminal needs to request to write third data into the distributed storage system, the first storage node receives a second data write request from the terminal, where the second data write request carries the third data and third location information, and the third location information is used to describe a location of the third data in a data body to which the third data belongs. The first storage node determines, based on the third location information, W memories related to writing the third data. The first storage node segments the third data into W-T data strips, and obtains T parity strips by means of calculation by using the W-T data strips. The T parity strips and the W-T data strips form a stripe including W strips, the W memories are in a one-to-one correspondence with the W strips, T and W are positive integers, and T is less than W.

The first storage node determines states that are of the W memories and currently recorded in the state information set cached by the first storage node, and if it is determined that W1 memories in the W memories are in a non-offline state (and, for example, W2 memories in the W memories are in an offline state), and the first storage node and the management node that is configured to release a state information set are in a connected state, sends, to y2 storage nodes to which the W1 memories belong, a data write request that carries a strip of the stripe. Correspondingly, after receiving the data write request from the first storage node, each of the y2 storage nodes may write a corresponding strip of the stripe into a corresponding memory included in the storage node.

For another example, in some possible implementations of this application, the method may further include the following steps: The first storage node receives a third data write request from the terminal, where the third data write request carries fourth data and fourth location information, and the fourth location information is used to describe a location of the fourth data in a data body to which the fourth data belongs. After determining, based on the fourth location information, W memories related to writing the fourth data, the first storage node segments the fourth data into W-T data strips, and obtains T parity strips by means of calculation by using the W-T data strips. The T parity strips and the W-T data strips form a stripe including W strips, the W memories are in a one-to-one correspondence with the W strips, T and W are positive integers, and T is less than W. When the state information set cached by the first storage node currently records that W1 memories in the W memories are in a non-offline state (and, for example, W2 memories in the W memories are in an offline state), and the first storage node and the management node that is configured to release a state information set are in a connected state, the first storage node sends, to y2 storage nodes to which the W1 memories belong, a data write request that carries a strip of the stripe and a node identifier of the management node that is configured to release a state information set.

Correspondingly, after receiving the data write request from the first storage node, each of the y2 storage nodes may compare the node identifier of the management node carried in the data write request with a node identifier that is of the management node and currently cached by the storage node, and if it is determined by comparison that the node identifier of the management node carried in the data write request is the same as the node identifier that is of the management node and currently cached by the storage node, write a corresponding strip of the stripe into a corresponding memory included in the storage node, or if it is determined by comparison that the node identifier of the management node carried in the data write request is different from the node identifier that is of the management node and currently cached by the storage node, refuse to write a corresponding strip of the stripe into a corresponding memory included in the storage node.

In some possible implementations of this application, when a strip allocated to a memory (for example, a second memory) fails to be written into the memory because the memory is offline, or the like, a reconstruction mechanism may be used to perform related strip reconstruction after the memory goes online again. For example, W1 is less than W, and the state information set cached by the first storage node currently records that W2 memories in the W memories are in an offline state. The method may further include the following steps: The first storage node generates a first reconstruction log, where the first reconstruction log records a memory identifier of a second memory in the W2 memories, the first reconstruction log further records a strip identifier of a first strip that corresponds to the second memory in the W strips, the first reconstruction log further records the stripe identifier of the stripe, and the second memory is any memory in the W2 memories.

Correspondingly, after the second memory in the W2 memories goes online again, and the second storage node to which the second memory belongs collects the first reconstruction log generated during an offline period of the second memory, the second storage node obtains the identifier, recorded in the first reconstruction log, of the first strip that needs to be written into the second memory; and determines W-T memories in which W-T strips other than the first strip that are included in the stripe are located, reads the W-T strips from the W-T memories, performs a check operation by using the W-T strips to reconstruct the first strip that needs to be written into the second memory, and writes the reconstructed first strip into the second memory.

It can be learned that the foregoing exemplified solution provides several possible implementations that can be used to verify validity of a state information set to some extent. These possible implementations help meet verification requirements of a plurality of reliability levels, and further help meet a plurality of read/write access efficiency requirements.

According to a second aspect, an embodiment of this application further provides a distributed storage system. The distributed storage system includes m storage nodes, each storage node includes at least one memory, each memory includes a non-volatile storage medium, and m is an integer greater than 1.

A first storage node in the m storage nodes is configured to: receive a first data read request from a terminal, where the first data read request carries first location information, and the first location information is used to describe a location of first data in a data body to which the first data belongs; determine, based on the first location information, a first memory in which the first data is located; and if the first memory belongs to the first storage node, when a state information set currently records that the first memory is in a trusted access state, read the first data from the first memory, and send a first data read response used for responding to the first data read request to the terminal, where the first data read response carries the read first data. The first data is, for example, a part or all of data in a strip to which the first data belongs.

In some possible implementations of this application, the distributed storage system further includes a management node that is configured to release a state information set.

The first storage node is further configured to: if the first memory belongs to a second storage node in the m storage nodes, the first memory is in a trusted access state, and the first storage node and the management node that is configured to release a state information set are in a connected state, forward the first data read request to the second storage node.

The second storage node is configured to: after receiving the first data read request from the first storage node, read the first data from the first memory, and send the first data read response used for responding to the first data read request to the first storage node or the terminal, where the first data read response carries the read first data.

In some possible implementations of this application, the first storage node is further configured to: if the first memory belongs to a second storage node in the m storage nodes, and the first memory is in a trusted access state, add, into the first data read request, an identifier of the state information set currently cached by the first storage node, and send, to the second storage node, the first data read request into which the identifier of the state information set is added.

The second storage node is configured to: after receiving the first data read request from the first storage node, compare the identifier of the state information set carried in the first data read request with an identifier of a state information set currently cached by the second storage node, and if it is determined by comparison that the identifier of the state information set carried in the first data read request is the same as the identifier of the state information set currently cached by the second storage node, read the first data from the first memory, and send the first data read response used for responding to the first data read request to the first storage node or the terminal, where the first data read response carries the read first data.

In some possible implementations of this application, the first storage node is further configured to: if the first memory belongs to a second storage node in the m storage nodes, and the first memory is in a trusted access state, add, into the first data read request, an identifier of the state information set currently cached by the first storage node and a node identifier of a management node that is configured to release a state information set, and send, to the second storage node, the first data read request into which the identifier of the state information set and the node identifier of the management node are added.

Correspondingly, the second storage node is configured to: after receiving the first data read request from the first storage node, compare the identifier of the state information set carried in the first data read request with an identifier of a state information set currently cached by the second storage node, compare the node identifier of the management node carried in the first data read request with a node identifier that is of the management node and currently cached by the second storage node, and if it is determined by comparison that the identifier of the state information set carried in the first data read request is the same as the identifier of the state information set currently cached by the second storage node, and it is determined by comparison that the node identifier of the management node carried in the first data read request is the same as the node identifier that is of the management node and currently cached by the second storage node, read the first data from the first memory, and send the first data read response used for responding to the first data read request to the first storage node or the terminal, where the first data read response carries the read first data.

In some possible implementations of this application, the first storage node is further configured to: if it is determined that the first memory is in an untrusted access state, x memories in N memories in which strips of a stripe to which the first data belongs are located belong to the first storage node, and N-x memories in the N memories belong to y storage nodes different from the first storage node, send, to the y storage nodes, a data read request that carries a stripe identifier of the stripe and an identifier of the state information set.

Each of the y storage nodes is configured to: after receiving the data read request from the first storage node, compare the identifier of the state information set carried in the data read request with an identifier of a state information set currently cached by the storage node, and if it is determined by comparison that the identifier of the state information set carried in the data read request is the same as the identifier of the state information set currently cached by the storage node, read a corresponding strip of the stripe from a corresponding memory included in the storage node, and send the read corresponding strip of the stripe to the first storage node.

The first storage node is further configured to: perform, based on strips of the stripe that are collected from the y storage nodes and the first storage node, a check operation to obtain the first data, and send the first data read response used for responding to the first data read request to the terminal, where the first data read response carries the obtained first data.

In some possible implementations of this application, for example, one of the m storage nodes is the management node. The first storage node is further configured to: when a state of the first memory changes from a first state to a second state, send a memory state change report to the management node, where the memory state change report indicates that the first memory is in the second state, the first state is different from the second state, and the first state and the second state each include any one of the following states: an offline state, a data reconstruction state, or a trusted access state.

The management node is configured to: after receiving the memory state change report from the first storage node, update a state that is of the first memory and recorded in a state information set cached by the management node into the second state, and update a version number of the state information set cached by the management node; and the management node sends an updated state information set to a storage node other than the management node in the m storage nodes.

Correspondingly, the first storage node is further configured to use the state information set from the management node to update the state information set currently cached by the first storage node. Correspondingly, another storage node also uses the state information set from the management node to update a state information set currently cached by the another storage node.

In some possible implementations of this application, the first storage node is further configured to receive a first data write request from the terminal, where the first data write request carries second data and second location information, and the second location information is used to describe a location of the second data in a data body to which the second data belongs.

The first storage node is further configured to: determine, based on the second location information, W memories related to writing the second data, segment the second data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: when the state information set cached by the first storage node currently records that W1 memories in the W memories are in a non-offline state and that W2 memories in the W memories are in an offline state, send, to y2 storage nodes to which the W1 memories belong, a data write request that carries a strip of the stripe and the identifier of the state information set.

Correspondingly, each of the y2 storage nodes is configured to: after receiving the data write request from the first storage node, compare the identifier of the state information set carried in the data write request with an identifier of a state information set currently cached by the storage node, and if it is determined by comparison that the identifier of the state information set carried in the data write request is the same as the identifier of the state information set currently cached by the storage node, write a corresponding strip of the stripe into a corresponding memory included in the storage node, or if it is determined by comparison that the identifier of the state information set carried in the data write request is different from the identifier of the state information set currently cached by the storage node, refuse to write a corresponding strip of the stripe into a corresponding memory included in the storage node.

In some possible implementations of this application, the first storage node is further configured to receive a second data write request from the terminal, where the second data write request carries third data and third location information, and the third location information is used to describe a location of the third data in a data body to which the third data belongs.

The first storage node is further configured to: after determining, based on the third location information, W memories related to writing the third data, segment the third data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: determine states that are of the W memories and currently recorded in the state information set cached by the first storage node, and if it is determined that W1 memories in the W memories are in a non-offline state (and, for example, W2 memories in the W memories are in an offline state), and the first storage node and the management node that is configured to release a state information set are in a connected state, send, to y2 storage nodes to which the W1 memories belong, a data write request that carries a strip of the stripe.

Correspondingly, each of the y2 storage nodes is configured to: after receiving the data write request from the first storage node, write a corresponding strip of the stripe into a corresponding memory included in the storage node.

In some possible implementations of this application, the first storage node is further configured to receive a third data write request from the terminal, where the third data write request carries fourth data and fourth location information, and the fourth location information is used to describe a location of the fourth data in a data body to which the fourth data belongs.

The first storage node is further configured to: after determining, based on the fourth location information, W memories related to writing the fourth data, segment the fourth data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: if the state information set cached by the first storage node currently records that W1 memories in the W memories are in a non-offline state (and, for example, W2 memories in the W memories are in an offline state), and the first storage node and the management node that is configured to release a state information set are in a connected state, send, to y2 storage nodes to which the W1 memories belong, a data write request that carries a strip of the stripe and a node identifier of the management node that is configured to release a state information set.

Correspondingly, each of the y2 storage nodes is configured to: after receiving the data write request from the first storage node, compare the node identifier of the management node carried in the data write request with a node identifier that is of the management node and currently cached by the storage node, and if it is determined by comparison that the node identifier of the management node carried in the data write request is the same as the node identifier that is of the management node and currently cached by the storage node, write a corresponding strip of the stripe into a corresponding memory included in the storage node, or if it is determined by comparison that the node identifier of the management node carried in the data write request is different from the node identifier that is of the management node and currently cached by the storage node, refuse to write a corresponding strip of the stripe into a corresponding memory included in the storage node.

In some possible implementations of this application, the first storage node is further configured to generate a first reconstruction log, where the first reconstruction log records a memory identifier of a second memory in the W2 memories, the first reconstruction log further records a strip identifier of a first strip that corresponds to the second memory in the W strips, the first reconstruction log further records the stripe identifier of the stripe, and the second memory is any memory in the W2 memories.

Correspondingly, for example, after the second memory in the W2 memories goes online again, and the second storage node to which the second memory belongs collects the first reconstruction log generated during an offline period of the second memory, the second storage node obtains the identifier, recorded in the first reconstruction log, of the first strip that needs to be written into the second memory, determines W-T memories in which W-T strips other than the first strip that are included in the stripe are located, reads the W-T strips from the W-T memories, performs a check operation by using the W-T strips to reconstruct the first strip that needs to be written into the second memory, and writes the reconstructed first strip into the second memory.

According to a third aspect, an embodiment of this application further provides a storage node. The storage node is one of m storage nodes included in a distributed storage system, each storage node includes at least one memory, each memory includes a non-volatile storage medium, and m is an integer greater than 1. The storage node includes a communications unit and a processing control unit.

The communications unit is configured to receive a first data read request from a terminal, where the first data read request carries first location information, and the first location information is used to describe a location of first data in a data body to which the first data belongs.

The processing control unit is configured to: if it is determined, based on the first location information, that a memory in which the first data is located is a first memory, and the first memory belongs to the storage node, when a state information set currently records that the first memory is in a trusted access state, read the first data from the first memory.

The communications unit is further configured to send a first data read response used for responding to the first data read request to the terminal, where the first data read response carries the read first data.

In some possible implementations of this application, the communications unit is further configured to: if the first memory belongs to a second storage node in the m storage nodes, the first memory is in a trusted access state, and the storage node and a management node that is configured to release a state information set are in a connected state, forward the first data read request to the second storage node.

The first data read request is used to trigger the second storage node to: after receiving the first data read request from the first storage node, read the first data from the first memory, and send the first data read response used for responding to the first data read request to the storage node or the terminal, where the first data read response carries the read first data.

In some possible implementations of this application, the communications unit is further configured to: if the first memory belongs to a second storage node in the m storage nodes, and the first memory is in a trusted access state, add, into the first data read request, an identifier of the state information set currently cached by the first storage node, and send, to the second storage node, the first data read request into which the identifier of the state information set is added.

The first data read request is used to trigger the second storage node to: after receiving the first data read request from the storage node, compare the identifier of the state information set carried in the first data read request with an identifier of a state information set currently cached by the second storage node, and if it is determined by comparison that the identifier of the state information set carried in the first data read request is the same as the identifier of the state information set currently cached by the second storage node, read the first data from the first memory, and send the first data read response used for responding to the first data read request to the storage node or the terminal, where the first data read response carries the read first data.

In some possible implementations of this application, one of the m storage nodes is the management node.

The communications unit is further configured to: when a state of the first memory changes from a first state to a second state, send a memory state change report to the management node, where the memory state change report indicates that the first memory is in the second state, the first state is different from the second state, and the first state and the second state each include any one of the following states: an offline state, a data reconstruction state, or a trusted access state. The memory state change report is used to trigger the management node to: after receiving the memory state change report from the first storage node, update a state that is of the first memory and recorded in a state information set cached by the management node into the second state, update a version number of the state information set cached by the management node, and send an updated state information set to a storage node other than the management node in the m storage nodes.

The processing control unit is configured to use the state information set from the management node to update the state information set currently cached by the storage node.

According to a fourth aspect, an embodiment of this application provides a data access method, applied to a first storage node. The first storage is located in a distributed storage system including m storage nodes, each storage node includes at least one memory, each memory includes a non-volatile storage medium, and m is an integer greater than 1.

The method includes: receiving, by the first storage node, a first data read request (from a terminal), where the first data read request carries first location information, and the first location information is used to describe a location of first data in a data body to which the first data belongs; and if the first storage node determines, based on the first location information, that a memory in which the first data is located is a first memory, and the first memory belongs to the first storage node, when a state information set currently records that the first memory is in a trusted access state, reading, by the first storage node, the first data from the first memory, and sending a first data read response used for responding to the first data read request, where the first data read response carries the read first data.

According to a fifth aspect, an embodiment of this application provides a storage node. The storage node is one of m storage nodes included in a distributed storage system, each storage node includes at least one memory, each memory includes a non-volatile storage medium, and m is an integer greater than 1.

The storage node includes a processor and a communications interface that are coupled to each other. The processor is configured to perform some or all of the steps of the method performed by a first storage node (or another storage node) in the foregoing aspects.

For example, the processor is configured to: receive a first data read request by using the communications interface, where the first data read request carries first location information, and the first location information is used to describe a location of first data in a data body to which the first data belongs; and if it is determined, based on the first location information, that a memory in which the first data is located is a first memory, and the first memory belongs to the first storage node, when a state information set currently records that the first memory is in a trusted access state, read the first data from the first memory, and send, by using the communications interface, a first data read response used for responding to the first data read request, where the first data read response carries the read first data.

According to a sixth aspect, an embodiment of this application provides a computer readable storage medium. The computer readable storage medium stores program code. The program code includes an instruction used to perform some or all of the steps of the method performed by any storage node (for example, a first storage node or a second storage node) in the first aspect.

According to a seventh aspect, an embodiment of this application provides a computer program product including an instruction. When the computer program product runs on a computer (the computer is, for example, a storage node), the computer performs some or all of the steps of the method performed by any storage node (for example, a first storage node or a second storage node) in the foregoing aspects.

According to an eighth aspect, an embodiment of this application provides a storage node, including a processor and a communications interface that are coupled to each other, and a memory. The processor is configured to perform some or all of the steps of the method performed by any storage node in the foregoing aspects.

According to a ninth aspect, an embodiment of this application further provides a service system, which may include a distributed storage system and a terminal. The distributed storage system and the terminal are communicatively connected. The distributed storage system is any distributed storage system provided in the embodiments of this application.

BRIEF DESCRIPTION OF DRAWINGS

FIG. 1-A and FIG. 1-B are schematic architectural diagrams of some distributed storage systems exemplified according to an embodiment of this application;

FIG. 1-C is a schematic diagram of memory state transition exemplified according to an embodiment of this application;

FIG. 1-D is a schematic diagram of an organization form of a state information set exemplified according to an embodiment of this application;

FIG. 1-E and FIG. 1-F are schematic diagrams of some stripe organization forms exemplified according to an embodiment of this application;

FIG. 2-A and FIG. 2-B are schematic diagrams of some file organization forms exemplified according to an embodiment of this application;

FIG. 3-A is a schematic flowchart of a state updating method exemplified according to an embodiment of this application;

FIG. 3-B and FIG. 3-C are schematic diagrams of some organization forms of state information sets exemplified according to an embodiment of this application;

FIG. 4-A is a schematic flowchart of another state updating method exemplified according to an embodiment of this application;

FIG. 4-B and FIG. 4-C are schematic diagrams of some organization forms of state information sets exemplified according to an embodiment of this application;

FIG. 5-A is a schematic flowchart of another data access method exemplified according to an embodiment of this application;

FIG. 5-B is a schematic diagram of an organization form of a reconstruction log exemplified according to an embodiment of this application;

FIG. 7-A is a schematic flowchart of a data reconstruction method exemplified according to an embodiment of this application;

FIG. 7-B and FIG. 7-C are schematic diagrams of some organization forms of state information sets exemplified according to an embodiment of this application;

DESCRIPTION OF EMBODIMENTS

Figure 6:
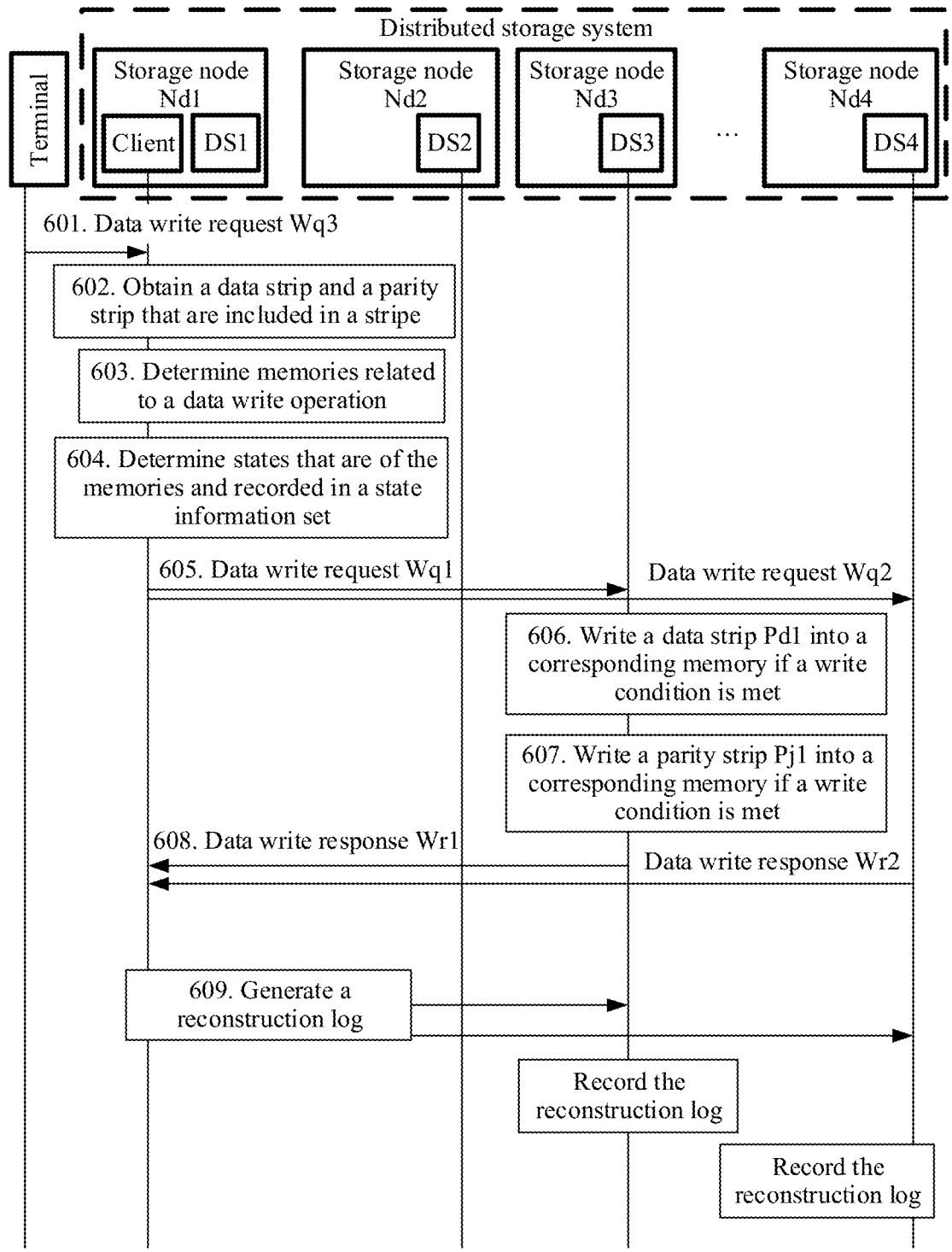
FIG. 6 is a schematic flowchart of another data access method exemplified according to an embodiment of this application.

The terms "include", "have", or any other variant thereof mentioned in the specification, claims, and the accompanying drawings of this application are intended to cover a non-exclusive inclusion. For example, a process, a method, a system, a product, or a device that includes a series of steps or units is not limited to the listed steps or units, but optionally may further include an unlisted step or unit, or optionally further includes another inherent step or unit of the process, the method, the product, or the device. In addition, terms "first", "second", "third", "fourth", and the like are used to differentiate objects, instead of describing a specific sequence.

With reference to the accompanying drawings, the following first describes some possible architectures of a distributed storage system.

Referring to FIG. 1-A and FIG. 1-B, some technical solutions in embodiments of this application may be specifically implemented based on a distributed storage system of an architecture exemplified in FIG. 1-A or FIG. 1-B or a variant architecture of the distributed storage system. The distributed storage system includes a plurality of storage nodes that are connected by using the Internet (in some scenarios, the storage node may also be referred to as a "storage serving node"). A terminal may perform access, such as read/write, to the distributed storage system by using a network.

It may be understood that a product form of the terminal (terminal) in the embodiments of this application may be, for example, a mobile Internet device, a notebook computer, a server, a tablet computer, a palmtop computer, a desktop computer, a mobile phone, or a terminal device of another product form capable of sending a data access request such as a data read request or a data write request. In the embodiments of this application, the terminal may also be substituted by a host (host).

The storage node includes one or more memories. The memory in the embodiments of this application includes a non-volatile storage medium, and the memory including the non-volatile storage medium may also be referred to as a non-volatile memory. In the embodiments, the memory may be, for example, a storage medium such as a hard disk, a compact disc erasable, or a solid state disk. In FIG. 1-A and FIG. 1-B, an example in which the memory is a hard disk is used for description.

The storage node may further include a network interface card, an internal memory, a processor, an expansion card, and the like. The processor may be interconnected to the memory, for example, by using the expansion card. The storage node may be interconnected to another storage node or another peripheral device by using the network interface card of the storage node. The network interface card may be considered as a communications interface of the storage node.

The processor may include functional units, and these functional units may be hardware (for example, a processor/field programmable gate array (English: field programmable gate array, FPGA for short) circuit, or a combination of a processor/FPGA circuit and other auxiliary hardware), or may be software. For example, in the architecture exemplified in FIG. 1-B, the processor may run functions such as a client (English: client), a data service (English: data service, DS for short) unit, and a status monitor. When being run, these functions may be considered as a module in the processor. When not being run, a program for implementing these functions may be a program in the internal memory, and in this case, it may also be considered that these modules are located in the internal memory. In general, these functions are in each storage node, and specifically, in a combination of a processor and an internal memory in each storage node. For convenience of description, these modules are drawn within the processor in FIG. 1-B. In some special cases, for example, in a System-On-a-Chip (SoC), the processor itself has a storage function, and program code may be directly burned into the processor. In this case, the internal memory is no longer a mandatory component.

The client is a system input/output (English: input output, IO for short) interface of a corresponding storage node and is mainly responsible for receiving an access request sent by another device (for example, a terminal or another storage node). The access request is also referred to as an IO request. The access request is, for example, a data read request or a data write request. The DS unit is mainly responsible for receiving the access request sent by the client, performing a read/write operation on a local memory based on the access request, and returning a result of the read/write operation to the client. The monitor may be responsible for monitoring a status of a memory included in a corresponding storage node, and certainly the monitor may further be responsible for monitoring a status of the corresponding storage node, and the like.

For example, a monitor may be deployed in each storage node in the distributed storage system, and the monitor in each storage node may be configured to monitor information such as a status of a memory included in this storage node. Further, monitors of all storage nodes may be connected together to form a monitor cluster. In addition, one "primary monitor" is elected from the monitor cluster in a manner specified by an administrator or by using an election algorithm, and remaining monitors are "secondary monitors". A storage node in which the primary monitor is located may be referred to as a "management node". For example, each secondary monitor may send, to the primary monitor, a current state of each memory included in a storage node in which the secondary monitor is located. The primary monitor may generate a state information set based on collected information such as a state of a memory included in each storage node. The state information set may be, for example, briefly referred to as a "node map (English: node map)", a "status file", or the like. The state information set records information such as a state of each memory. Further, for example, the secondary monitor may send, to the primary monitor, a current state of the storage node in which the secondary monitor is located. The state information set may further record a state of each storage node, and the like. As described above, the monitor is a function implemented by the processor by executing the program in the internal memory. In general, it may be considered that the monitor is a function of the processor and the internal memory or that the monitor is a function of the storage node. Therefore, in the following description, a function of the primary monitor may be performed by a primary processor, or by a primary processor, the processor, and the internal memory, or by a primary storage node; a function of the secondary monitor may be performed by a secondary processor, or by a secondary processor, the processor, and the internal memory, or by a secondary storage node.

The primary monitor may actively push a latest state information set to another storage node, or another storage node may actively request a latest state information set from the primary monitor. A monitor (that is, a secondary monitor) in the another storage node may cache the received state information set into an internal memory of the another storage node, and the state information set cached in the internal memory is a state information set locally maintained by a corresponding storage node (a corresponding monitor). Each time the secondary monitor receives a state information set from the primary monitor, the secondary monitor may use the state information set latest received from the primary monitor, to update the state information set currently cached by the secondary monitor. That is, the secondary monitor ensures that the currently cached state information set is the latest state information set received by the secondary monitor.

It may be understood that, when the secondary monitor and the primary monitor are in a connected state, the state information set currently cached by the secondary monitor is usually the latest state information set released by the primary monitor. However, when the secondary monitor and the primary monitor are not in a connected state, the secondary monitor may miss the latest state information set released by the primary monitor, and therefore the state information set currently cached by the secondary monitor may not be the latest state information set released by the primary monitor. Certainly, if the primary monitor has not released a new state information set within a period when the secondary monitor and the primary monitor are not in a connected state, the state information set currently cached by the secondary monitor may still be the latest state information set released by the primary monitor. Devices in a connected state can directly or indirectly communicate with each other. Therefore, a storage node that is in a state of being connected to the management node can obtain a latest version of the state information set from the management node.

A status (access status) of a memory includes an online (English: online) state and an offline (English: offline) state. The online state includes a data reconstruction state and a trusted access state. The data reconstruction state may also be referred to as a catch-up state. The trusted access state may also be referred to as a normal (English: normal) state.

It may be understood that, if data reconstruction needs to be performed, a memory may enter a trusted access state after the data reconstruction is complete; or if no data reconstruction needs to be performed, a memory, for example, may directly change from an offline state to a trusted access state. In general, both the offline state and the data reconstruction state can be considered as an untrusted access state.

The status of the memory reflects validity (that is, trustable or not) of data in the memory. If the memory is in a trusted access state, it indicates that data allocated to the memory is all successfully written into the memory. That is, the memory into which the allocated data is all written is in a trusted access state. For example, when a memory is in a trusted access state, it may be considered that data on the memory in such a state is valid. For example, when a memory is in a data reconstruction state, it indicates that at this moment, the memory is reconstructing related data that is lost during an offline period. In this case, it may be considered that data on the memory is probably invalid, that is, the memory is in an untrusted access state. When a memory is in an offline state, it may be considered that in this case, data on the memory is invalid, that is, the memory is in an untrusted access state. It may be understood that the memory in an offline state cannot be accessed, and data can neither be read from nor written into the memory.

Referring to FIG. 1-C, FIG. 1-C exemplifies possible manners of transition between different states of a memory. The memory may change from an online state to an offline state, or may change from an offline state to an online state. Specifically, for example, the memory may change from an offline state to a data reconstruction state or a trusted access state, or may change from a data reconstruction state to a trusted access state, or may change from a data reconstruction state or a trusted access state to an offline state.

The memory may be offline due to a plurality of factors. For example, when a memory in a storage node cannot be detected by the storage node, or when a storage node receives a fault status report (the fault status report indicates that the memory is offline) from a memory, the storage node may set a state of the corresponding memory to an offline state. For another example, when the management node (primary monitor) fails to receive a heartbeat message from a storage node a plurality of consecutive times, it indicates that the storage node is in an offline state, and the management node may set all memories included in the storage node to be in an offline state.

The state information set may record a memory ID and a state of each memory, and may further record a node ID and a state of a storage node to which each memory belongs. Referring to FIG. 1-D, FIG. 1-D exemplifies a possible representation form of a state information set. The state information set includes a version number of the state information set, and an identifier and a state (the state may be, for example, an offline state, a data reconstruction state, or a trusted access state) of each memory (the memory is, for example, a hard disk in the figure).

Because the state of the memory varies with time, the state information set is adaptively updated upon a change of the state of the memory. For example, after the management node (primary monitor) receives a memory state change report (a state of a memory changes, for example, the memory is unplugged and powered off, or is powered on again) or determines that the memory is offline (for example, the management node has not received a heartbeat message from a corresponding storage node within specific duration), the management considers that a condition for updating a state information set is met, and the management node updates the state information set. An updated state information set corresponds to a new version number, and the updated state information set records a changed memory state. The management node pushes the updated state information set to another storage node (secondary monitor). The version number of the state information set may be generated by the primary monitor based on a global variable. Specifically, for example, each time the state information set is updated, the version number increments by +1 or +2 on a current basis. Therefore, different version numbers may indicate different state information sets, and whether two state information sets are the same can be determined by comparing version numbers of the two state information sets.

The memory in the distributed storage system may store various data bodies (the data body refers to data that can be stored by the memory, and the data body may be, for example, a file, an object, a record, or data in another format). Generally, considering a factor such as system reliability, different strips of a same data body are respectively stored into different memories. A parity strip can be obtained by performing a redundancy check operation (for example, an EC operation) on a data strip. A check redundancy configuration (for example, an EC configuration) is used to describe a proportion relationship between a data strip and a parity strip in a stripe. For example, a check redundancy configuration of a file may be denoted as A:T, and in this case, A is a quantity of data strips included in a stripe, and T (T indicates redundancy) is a quantity of parity strips included in the stripe. For example, assuming that a redundancy check algorithm is an EC algorithm, when the check redundancy configuration (that is, the EC configuration) is 2:1, 2 is a quantity of data strips included in a stripe (EC stripe), and 1 is a quantity of parity strips included in the stripe. That is, in this case, the stripe includes two data strips and one parity strip, and the two data strips and one parity strip that are included in the stripe are respectively stored into different memories. That is, three memories are needed to store the two data strips and one parity strip that are included in the stripe. For another example, assuming that a check redundancy configuration (that is, an EC configuration) is 16:4, 16 is a quantity of data strips included in a stripe (EC stripe), and 4 is a quantity of parity strips included in the stripe. That is, in this case, the stripe includes 16 data strips and 4 parity strips, and then 20 memories are needed to respectively store the 20 strips included in the stripe. Other cases may be understood by analogy. FIG. 1-E exemplifies a stripe including two data strips and one parity strip. FIG. 1-F shows a stripe including a plurality of data strips and a plurality of parity strips.

Further, one distributed storage system can support one or more check redundancy configurations, each check redundancy configuration may correspond to one or more check member groups, and each check member group includes a plurality of memories. Certainly, memories included in different check member groups may be completely different or may be partially different, that is, each memory may serve one or more check member groups. For example, if a check redundancy configuration is 2:1, each check member group corresponding to the check redundancy configuration includes three (2+1=3) memories. For example, if a check redundancy configuration is 4:2, each check member group corresponding to the check redundancy configuration includes six (4+2=6) memories. For example, if a check redundancy configuration is 16:4, each check member group corresponding to the check redundancy configuration includes 20 (16+4=20) memories; and so on.

In addition, when a length of a file is too large (for example, the file length is greater than 1 Gb), sometimes for convenience of management, the file may be divided into file segments, for example, file segments that are not greater than 500 Mb or 1 Gb. Referring to FIG. 2-A, FIG. 2-A is a schematic diagram in which a file is divided into file segments. Each file segment of the file may correspond to a same or a different check redundancy configuration, and check member groups of different file segments may be the same or different. In this case, a file segment may be considered as a file. For example, referring to FIG. 2-B, FIG. 2-B is a schematic diagram in which a file is not divided into file segments.

The following describes some related methods in this application by using some embodiments.

Embodiment 1

With reference to the accompanying drawings, the following first uses an example to describe a state updating method. The state updating method is applied to a distributed storage system. For example, the distributed storage system includes m storage nodes. The m storage nodes may include, for example, storage nodes Nd2, Nd1, Nd3 and Nd4. For example, the storage node Nd1 is a management node. An implementation in a case in which the distributed storage system includes more or fewer storage nodes may be understood by analogy. In the following exemplified solution, a non-management node mainly actively triggers the management node to update and release a state information set.

Referring to FIG. 3-A, FIG. 3-A is a schematic flowchart of a state updating method according to an embodiment of this application. Referring to FIG. 3-A, a state updating method provided in an embodiment of this application may include the following steps.

301. When a state of a memory Nd2-D1 in the storage node Nd2 changes, the storage node Nd2 sends a memory state change report Report1 to the management node Nd1, where the memory state change report Report1 is used to indicate a latest changed state of the memory Nd2-D1.

The memory state change report Report1 may carry a memory identifier, a state identifier, and the like of the memory Nd2-D1. For example, when the latest changed state of the memory Nd2-D1 is an offline state, the state identifier of the memory Nd2-D1 carried in the memory state change report Report1 indicates the offline state. For another example, when the latest changed state of the memory Nd2-D1 is a data reconstruction state, the state identifier of the memory Nd2-D1 carried in the memory state change report Report1 indicates the data reconstruction state. For still another example, when the latest changed state of the memory Nd2-D1 is a trusted access state, the state identifier of the memory Nd2-D1 carried in the memory state change report Report1 indicates the trusted access state; and so on.

302. The management node Nd1 receives the memory state change report Report1 from the storage node Nd2, and the management node Nd1 updates, based on the memory state change report Report1, a state information set currently cached by the management node Nd1.

Specifically, for example, the management node Nd1 updates a state that is of the memory Nd2-D1 and recorded in the state information set currently cached by the management node Nd1 to the state that is of the memory Nd2-D1 and indicated by the memory state change report Report1, and updates a version number in the state information set (that is, a version number of the state information set itself).

For example, when a monitor is deployed in each storage node, specifically, a secondary monitor in the storage node Nd2 may send the memory state change report Report1 to the storage node Nd1. Correspondingly, a primary monitor in the management node Nd1 may receive the memory state change report Report1 from the storage node Nd2.

For example, the state information set that has not been updated by the management node Nd1 is exemplified in FIG. 3-B. For example, the state information set that has been updated by the management node Nd1 is exemplified in FIG. 3-C. Certainly, in actual application, the state information set is not limited to such exemplified forms.

303. The management node Nd1 sends a latest updated state information set to other storage nodes.

Correspondingly, the storage nodes Nd2, Nd3, and Nd4 separately receive the updated state information set from the management node Nd1. The storage nodes Nd2, Nd3, and Nd4 separately use the state information set from the management node Nd1 to update their respective currently cached state information sets. In this way, the state information sets cached by the storage nodes (Nd1, Nd2, Nd3, and Nd4) can keep relatively synchronized.

The foregoing solution provides a mechanism in which the non-management node mainly actively triggers the management node to update and release the state information set. Specifically, when a state of a memory in a storage node changes, the storage node actively sends a memory state change report to the management node, so as to trigger the management node to update and release a state information set in a timely manner based on the memory state change report. This mechanism helps enable each storage node in the distributed storage system to synchronize the state information set to a greatest extent, helps enable each storage node to learn, in a relatively accurate manner, a state of each memory in the distributed storage system, and serves as a basis for a subsequent read/write operation performed based on the state of the memory.

Embodiment 2

With reference to the accompanying drawings, the following uses an example to describe another state updating method. The state updating method is applied to a distributed storage system. For example, the distributed storage system may include m storage nodes. The m storage nodes may include, for example, storage nodes Nd2, Nd1, Nd3, . . . , and Nd4. For example, the storage node Nd1 is a management node. An implementation in a case in which the distributed storage system includes more or fewer storage nodes may be understood by analogy. In the following exemplified solution, the management node mainly updates and releases a state information set based on a result of heartbeat monitoring on other storage nodes.

Referring to FIG. 4-A, FIG. 4-A is a schematic flowchart of another state updating method according to another embodiment of this application. Referring to FIG. 4-A, another state updating method provided in another embodiment of this application may include the following steps.

401. The management node Nd1 receives a heartbeat message periodically sent by each storage node.

402. When the management node Nd1 has not received, within specified duration (the specified duration may be, for example, 5 minutes, 10 minutes, 20 minutes, 1 minute, or other duration), a heartbeat message sent by the storage node Nd2, the management node Nd1 may consider that the storage node Nd2 is in an offline state; and when considering that the storage node Nd2 is in an offline state, the management node Nd1 updates a state information set currently cached by the management node Nd1.

Specifically, the management node Nd1 updates states that are of all memories included in the storage node Nd2 and recorded in the state information set currently cached by the management node Nd1 into an offline state, and updates a version number of the state information set.

For example, when a monitor is deployed in each storage node, specifically, a primary monitor in the management node Nd1 may receive the heartbeat message periodically sent by a secondary monitor in each storage node.

For example, the storage node Nd2 includes memories Nd2-D1, Nd2-D2, and Nd2-D3. In this case, for example, the state information set that has not been updated by the management node Nd1 is exemplified in FIG. 4-B; for example, the state information set that has been updated by the management node Nd1 is exemplified in FIG. 4-C. Certainly, in actual application, the state information set is not limited to such exemplified forms.

403. The management node Nd1 sends a latest updated state information set to other storage nodes.

Correspondingly, the storage nodes Nd3 and Nd4 separately receive the updated state information set from the management node Nd1. The storage nodes Nd3 and Nd4 separately use the state information set from the management node Nd1 to update their respective currently cached state information sets. In this way, the state information set cached by the management node Nd1 can keep relatively synchronized with the state information sets cached by the other storage nodes (for example, Nd3 and Nd4). However, the storage node Nd2 is in an offline state, and therefore cannot receive the latest state information set released by the management node Nd1. Therefore, during an offline period, a state information set cached by the storage node Nd2 cannot keep synchronized with the state information set cached by the management node. When the storage node Nd2 goes online again, the storage node Nd2 may actively request the latest state information set from the management node to update the state information set cached by the storage node Nd2. Certainly, the storage node Nd2 may alternatively wait passively until the management node releases the latest state information set again; and use the latest state information set that is released by the management node again to update the state information set cached by the storage node Nd2.

The foregoing solution provides a mechanism in which the management node mainly updates and releases the state information set based on the result of heartbeat monitoring on the other storage nodes. This mechanism helps enable each storage node in the distributed storage system to synchronize the state information set to a greatest extent, helps enable each storage node to learn, in a relatively accurate manner, a state of each memory in the distributed storage system, and serves as a basis for a subsequent read/write operation performed based on the state of the memory.

It may be understood that in some possible implementations, the state updating methods described in FIG. 3-A and FIG. 4-A may both be applied to a same distributed storage system. That is, the management node updates and releases the state information set based on the result of heartbeat monitoring on the other storage nodes; alternatively, the non-management node may actively trigger the management node to update and release the state information set.

Embodiment 3

With reference to the accompanying drawings, the following further uses an example to describe a data access method, which is mainly used for a possible scenario in which a terminal writes data from a distributed storage system. The data access method is applied to the distributed storage system. For example, the distributed storage system includes m storage nodes, and the m storage nodes include storage nodes Nd1 and Nd2. A memory Nd2-D1, a memory Nd2-D2, and a memory Nd2-D3 are all located in the storage node Nd2. This embodiment is mainly described by using an example in which a corresponding check redundancy configuration is specifically 2:1, that is, a stripe includes two data strips and one parity strip. A case of another check redundancy configuration may be understood by analogy.

Referring to FIG. 5-A, FIG. 5-A is a schematic flowchart of a data access method according to an embodiment of this application. As exemplified in FIG. 5-A, a data access method provided in an embodiment of this application may include the following steps.

501. When a terminal needs to write data into a distributed storage system, the terminal sends a data write request that carries to-be-written data to the distributed storage system. For convenience of the following description, the data write request is named Wq3 in this embodiment. In this step, the storage node Nd1 receives the data write request Wq3 from the terminal.

The data write request Wq3 may carry data Data1 (the data Data1 is the to-be-written data), a file identifier of a file to which the data Data1 belongs, and location information of the data Data1. The location information of the data Data1 is used to describe a location of the data Data1 in the file to which the data Data1 belongs. The location information of the data Data1 includes, for example, a file offset address of the data Data1 (the file offset address of the data Data1 indicates a start location of the data Data1 in the file), a length of the data Data1, and the like.

502. The storage node Nd1 segments data Data1 into two data strips (for convenience of the following description, the two data strips are named a data strip Pd1 and a data strip Pd2 in this embodiment), and the storage node Nd1 obtains one parity strip (for convenience of the following description, the parity strip is named a parity strip Pj1 in this embodiment) by means of calculation by using the two data strips, where the one parity strip and two data strips form one stripe including three strips. For example, the data strip Pd1 and the data strip Pd2 may be the same or different in length.

503. The storage node Nd1 determines, based on location information of the data Data1, memories related to writing the data Data1.

For example, the memories that are related to writing the data Data1 and determined by the storage node Nd1 are the memory Nd2-D1, the memory Nd2-D2, and the memory Nd2-D3.

Generally, during allocation of file data to memories, memories to which a segment of file data is specifically allocated for storage are usually determined based on a location of the file data in a file. Therefore, the memories related to writing the data Data1 may be determined based on the location information of the data Data1.

The foregoing three memories (Nd2-D1, Nd2-D2, and Nd2-D3) are in a one-to-one correspondence with the three strips. Specifically, for example, the parity strip Pj1 corresponds to the memory Nd2-D3, the data strip Pd1 corresponds to the memory Nd2-D1, and the data strip Pd2 corresponds to the memory Nd2-D2.

504. The storage node Nd1 determines states that are of the memory Nd2-D1, the memory Nd2-D2, and the memory Nd2-D3 and currently recorded in a state information set locally cached by the storage node Nd1.

A case in which the state information set locally cached by the storage node Nd1 currently records that the memories Nd2-D2 and Nd2-D3 are in an online state (a trusted access state or a data reconstruction state) and that the memory Nd2-D1 is in an offline state is used as an example for the following description.

505. When it is determined that the memory Nd2-D2 and the memory Nd2-D3 are in an online state and that the memory Nd2-D1 is in an offline state, the storage node Nd2 writes the data strip Pd2 into the memory Nd2-D2, and the storage node Nd2 writes the parity strip Pj1 into the memory Nd2-D3.

In this step, data is normally written into remaining non-offline storage nodes even when there is an offline storage node, because according to an EC check algorithm, even though a specific quantity of strips fail to be written, the strips that fail to be written can be restored by reconstruction by using strips that are successfully written, and no data loss is caused. Provided that a quantity of the strips that fail to be written does not exceed a quantity of parity strips, the EC check algorithm can function normally. Certainly, another check algorithm is similar thereto.

506. Because the memory Nd2-D1 in the storage node Nd2 is in an offline state, and accordingly the data strip Pd1 fails to be written into the memory Nd2-D1, the storage node Nd1 or the storage node Nd2 generates a reconstruction log log 1.

The reconstruction log log 1 records a strip identifier of the strip (the data strip Pd1) that fails to be written, and a memory identifier of the memory (the memory Nd2-D1) into which the strip fails to be written. The reconstruction log log 1 may further record a stripe identifier of a stripe to which the strip (the data strip Pd1) that fails to be written belongs, and the like. The reconstruction log log 1 is used for subsequent reconstruction of the data strip Pd1 after the memory Nd2-D1 goes online again. FIG. 5-B exemplifies a possible representation form of a reconstruction log log 1. Certainly, another representation form may also be used.

It may be understood that if the memory Nd2-D1 is also in a trusted access state, the storage node Nd2 may directly write the data strip Pd1 into the memory Nd2-D1. In this case, the storage node Nd1 or the storage node Nd2 does not need to perform a related step of generating the reconstruction log log 1.

A data write scenario for which the foregoing solution is mainly used is a possible scenario in which memories corresponding to strips in a stripe are all located in a same storage node. In this possible scenario, the state information set used for recording a memory state is introduced into the distributed storage system, and therefore the state information set may be used to record and manage access states of the memories in the distributed storage system. Data can be directly written into a memory in an online state. For a memory in an offline state, a related reconstruction log can be directly generated without a need to generate a related reconstruction log after a data write attempt fails. In the scenario exemplified in this embodiment, in the prior art, first the data write attempt is made, and the related reconstruction log is generated after the data write attempt fails. In the solution of this embodiment, useless attempts can be reduced, thereby improving data write efficiency and further helping improve system performance.

Embodiment 4

With reference to the accompanying drawings, the following further uses an example to describe another data access method, which is mainly used for another possible scenario in which a terminal writes data from a distributed storage system. In the previous embodiment, memories corresponding to strips are located in a same storage node. In the scenario of this embodiment, these memories are located in different storage nodes.

For example, the distributed storage system includes m storage nodes, and the m storage nodes include storage nodes Nd2, Nd1, Nd3, and Nd4. A memory Nd2-D1 belongs to the storage node Nd2, a memory Nd3-D1 belongs to the storage node Nd3, and a memory Nd4-D1 belongs to the storage node Nd4. This embodiment is mainly described by using an example in which a check redundancy configuration is specifically 2:1, that is, a stripe includes two data strips and one parity strip. A case of another check redundancy configuration may be understood by analogy.

Referring to FIG. 6, FIG. 6 is a schematic flowchart of another data access method according to another embodiment of this application. As exemplified in FIG. 6, another data access method provided in another embodiment of this application may include the following steps.

601 and 602. Steps 601 and 602 are the same as steps 501 and 502. Therefore, for related descriptions, refer to corresponding steps 501 and 502, and details are not described herein again.

603. The storage node Nd1 determines, based on location information of data Data1, memories related to writing the data Data1.

For example, the memories that are related to writing the data Data1 and determined by the storage node Nd1 are the memory Nd2-D1, the memory Nd3-D1, and the memory Nd4-D1. The foregoing three memories (Nd2-D1, Nd3-D1, and Nd4-D1) are in a one-to-one correspondence with the three strips. Specifically, for example, a parity strip Pj1 corresponds to the memory Nd4-D1, a data strip Pd1 corresponds to the memory Nd2-D1, and a data strip Pd2 corresponds to the memory Nd3-D1.

604. The storage node Nd1 determines states that are of the memory Nd2-D1, the memory Nd3-D1, and the memory Nd4-D1 and currently recorded in a state information set locally cached by the storage node Nd1. A case in which the state information set locally cached by the storage node Nd1 currently records that the memories Nd3-D1 and Nd4-D1 are in an online state and that the memory Nd2-D1 is in an offline state is used as an example for description.

Specifically, if the storage node Nd1 and a management node are in a connected state, the storage node Nd1 can determine the states that are of the memory Nd2-D1, the memory Nd3-D1, and the memory Nd4-D1 and currently recorded in the state information set locally cached by the storage node Nd1.

605. When it is determined that the memory Nd3-D1 and the memory Nd4-D1 are in an online state and that the memory Nd2-D1 is in an offline state, the storage node Nd1 sends a data write request Wq1 to the storage node Nd3 to which the memory Nd3-D1 belongs, and the storage node Nd1 sends a data write request Wq2 to the storage node Nd4 to which the memory Nd4-D1 belongs.

For example, the data write request Wq1 carries the data strip Pd2 and a version number of the state information set that is locally cached by the storage node Nd1 currently. Further, the data write request Wq1 may further carry a length (the length may be, for example, 110 Kb) of the data strip Pd2, a file offset address of the data strip Pd2, a stripe identifier of the stripe to which the data strip Pd2 belongs, a strip identifier of the data strip Pd2, a file identifier of a file to which the data strip Pd2 belongs, and the like.

For another example, the data write request Wq2 may carry the parity strip Pj1 and the version number of the state information set that is locally cached by the storage node Nd1 currently. Further, the data write request Wq2 may further carry a length of the parity strip Pj1, the stripe identifier of the stripe to which the parity strip Pj1 belongs, a strip identifier of the parity strip Pj1, and the like.

It may be understood that the storage node Nd1 adds, into a data write request sent to other storage nodes, the version number of the state information set cached by the storage node Nd1, so that other storage nodes can verify, by comparing version numbers, whether the state information set cached by the storage node Nd1 is valid.

606. After receiving the data write request Wq1 from the storage node Nd1, the storage node Nd3 compares the version number of the state information set carried in the data write request Wq1 with a version number of a state information set currently cached by the storage node Nd3.

If it is determined by comparison that the version number of the state information set carried in the data write request Wq1 is the same as the version number of the state information set currently cached by the storage node Nd3, and the storage node Nd3 and the management node are in a connected state (that is, a secondary monitor in the storage node Nd3 is normally connected to a primary monitor in the management node), it may be considered that the secondary monitor in the storage node Nd3 can receive, normally in a timely manner, a latest version of a state information set released by the primary monitor in the management node. Therefore, in this case, it may be considered that the state information set currently cached by the storage node Nd3 is the latest version of the state information set maintained by the primary monitor. The version number of the state information set carried in the data write request Wq1 is the same as the version number of the state information set currently cached by the storage node Nd3, that is, the state information set currently cached by the storage node Nd1 is also the latest version of the state information set maintained by the primary monitor. In this case, the state (trusted access state) that is of the memory Nd3-D1 and recorded in the state information set currently cached by the storage node Nd1 is also supposed to accord with an actual situation, and the storage node Nd3 writes the data strip Pd2 into the memory Nd3-D1.

In addition, if it is determined by comparison that the version number of the state information set carried in the data write request Wq1 is different from the version number of the state information set currently cached by the storage node Nd3, it may be considered that the state that is of Nd3-D1 and recorded in Nd1 is not accurate. In other words, although the state that is of Nd3-D1 and recorded in Nd1 is a trusted access state, it cannot be ensured that an actual state of Nd3-D1 is a trusted access state. Because Nd3-D1 may be in an untrusted access state, the storage node Nd3 may refuse to write the data strip Pd2 into the memory Nd3-D1.

It should be particularly noted that when a storage node and the management node are in a connected state, there is a relatively high probability that a state information set cached by the storage node is the latest state information set released by the management node. However, in some relatively special cases, even though the storage node and the management node are in a connected state, if the storage node becomes temporarily faulty exactly the moment the management node releases the state information set, or quality of communication between the storage node and the management node is extremely poor exactly the moment the management node releases the state information set, it is possible that the storage node cannot obtain the latest state information set released by the management node. That is, even though the storage node and the management node are in a connected state, there is still a very low probability that a state information set cached by the storage node is not the latest state information set released by the management node. Therefore, when the storage node and the management node are in a connected state, version numbers of their respective currently cached state information sets are further compared; and if the version numbers are the same, it may be considered that their respective currently cached state information sets are valid. This practice can further improve reliability.

Further, the storage node Nd3 sends a data write response Wr1 used for responding to the data write request Wq1 to the storage node Nd1. The data write response Wr1 carries a result of a write operation on the data strip Pd2. Specifically, when the storage node Nd3 successfully writes the data strip Pd2 into the memory Nd3-D1, a result of the write operation is a write success; or when the storage node Nd3 fails to write the data strip Pd2 into the memory Nd3-D1 (for example, the storage node Nd2 refuses to write the data strip into the memory Nd3-D1), a corresponding result of the write operation is a write failure.

607. After receiving the data write request Wq2 from the storage node Nd1, the storage node Nd4 makes comparison, similar to step 606, between version numbers of state information sets (a difference lies in that the storage node Nd3 changes to the storage node Nd4, and the data write request Wq1 changes to the data write request Wq2), to determine whether to write a parity strip Pj1 into the memory Nd4-D1. A specific execution process of step 607 is not described herein again.

Step 606 and step 607 may be performed simultaneously or performed one after another.

608. The storage node Nd1 receives a data write response Wr1 from the storage node Nd3, and the storage node Nd1 receives the data write response Wr2 from the storage node Nd4.

Further, if a data write response indicates a corresponding write failure, the storage node Nd1 may resend a corresponding data write request to request a rewrite. For example, if the data write request Wr1 indicates a corresponding write failure, the storage node Nd1 may resend the data write request Wq1 to the storage node Nd3.

609. Because the memory Nd2-D1 in the storage node Nd2 is in an offline state, and a data strip Pd1 fails to be written into the memory Nd2-D1, the storage node Nd1 generates a reconstruction log log 1, and the storage node Nd1 sends the reconstruction log log 1 to a storage node (for example, the storage node Nd3 and/or the storage node Nd4) into which a strip is successfully written. Correspondingly, the storage node Nd3 and/or the storage node Nd4 may receive and store the reconstruction log log 1, where the reconstruction log log 1 is used for subsequent reconstruction of the data strip Pd1 after the memory Nd2-D1 goes online again.

The reconstruction log log 1 records a strip identifier of the strip (the data strip Pd1) that fails to be written, and a memory identifier of the memory (the memory Nd2-D1) into which the strip fails to be written. The reconstruction log log 1 may further record a stripe identifier of a stripe to which the strip (the data strip Pd1) that fails to be written belongs, and the like.

A data write scenario for which the foregoing solution is mainly used is a possible scenario in which memories corresponding to strips in a stripe are not located in a same storage node. In this possible scenario, the state information set used for recording a memory state is introduced into the distributed storage system, and therefore the state information set may be used to record and manage access states of the memories in the distributed storage system.

Specifically, this embodiment describes a method for writing to-be-written data, and memories corresponding to strips in a stripe corresponding to the to-be-written data are not located in a same storage node. When the storage node Nd1 and the management node are in a connected state, and the state information set cached by the storage node Nd1 records that the memories Nd3-D1 and Nd4-D1 are online, the storage node Nd1 preliminarily considers that data can be successfully written into the memories Nd3-D1 and Nd4-D1. To verify validity of the state information set cached by storage node Nd1, the storage node Nd1 adds, into the data write request sent to other storage nodes (the storage node Nd3 and the storage node Nd4), the version number of the state information set cached by the storage node Nd1. Other storage nodes compare the version number of the state information set carried in the data write request with version numbers of state information sets cached by the other storage nodes. When the version number of the state information set carried in the data write request is the same as the version numbers of the state information set currently cached by the other storage nodes, it may be considered that the state information set cached by the storage node Nd1 is valid. Therefore, a state that is of a related memory and recorded in the state information set is supposed to be accurate. In this case, corresponding data write is usually successful, and therefore the data is directly written into the related memory. Otherwise, it may be considered that the state information set cached by the storage node Nd1 may be invalid, and therefore a state that is of a related memory and recorded in the state information set may be inaccurate. In this case, corresponding data write is very likely to fail, and therefore refusing to write is a relatively proper practice.

An effect of this embodiment is similar to that of the foregoing embodiment in the following: For a memory in an offline state, a related reconstruction log can be directly generated without a need to generate the related reconstruction log in a conventional manner after a data write attempt fails, thereby helping improve data write efficiency and helping improve system performance.

Embodiment 5

With reference to the accompanying drawings, the following further uses an example to describe a data reconstruction method. The data reconstruction method is applied to a distributed storage system. For example, the distributed storage system may include m storage nodes, and the m storage nodes include storage nodes Nd1, Nd2, Nd3, and Nd4. The storage node Nd1 is a management node (that is, a storage node in which a primary monitor is located) that releases a state information set. For example, a memory Nd2-D1 belongs to the storage node Nd2, a memory Nd3-D1 belongs to the storage node Nd3, and the memory Nd4-D1 belongs to the storage node Nd4. The data reconstruction method may be, for example, performed after the solution exemplified in FIG. 6

Referring to FIG. 7-A, FIG. 7-A is a schematic flowchart of a data reconstruction method according to an embodiment of this application. As exemplified in FIG. 7-A, a data reconstruction method provided in an embodiment of this application may include the following steps.

701. When the storage node Nd2 determines that the memory Nd2-D1 goes online, the storage node Nd2 sends a memory state change report P2 to the management node Nd1, where the memory state change report P2 may indicate that a state of the memory Nd2-D1 changes from an offline state to a data reconstruction state. Specifically, for example, the memory state change report P2 may carry a memory identifier and a state identifier of the memory Nd2-D1 (the state identifier is a state identifier of the data reconstruction state, that is, a state indicated by the state identifier is the data reconstruction state).

702. The management node Nd1 receives the memory state change report P2 from the storage node Nd2, and the management node Nd1 updates a cached state information set. Specifically, the management node Nd1 updates a state that is of the memory Nd2-D1 and recorded in the state information set cached by the management node Nd1 to the state that is of the memory Nd2-D1 and indicated by the memory state change report P2, and updates a version number recorded in the state information set.

For example, when a monitor is deployed in each storage node, specifically, a secondary monitor in the storage node Nd2 may send the memory state change report P2 to the management node Nd1. Correspondingly, a primary monitor in the management node Nd1 may receive the memory state change report P2 from the storage node Nd2.

For example, the state information set that has not been updated by the management node Nd1 is exemplified in FIG. 3-C. For example, the state information set that has been updated by the management node Nd1 is exemplified in FIG. 7-B. Certainly, in actual application, the state information set is not limited to such exemplified forms.

703. The storage node Nd1 sends an updated state information set to other storage nodes.

Correspondingly, the storage nodes Nd2, Nd3, and Nd4 separately receive the updated state information set from the management node Nd1. The storage nodes Nd2, Nd3, and Nd4 use the state information set from the management node Nd1 to update their currently cached state information sets. In this way, the state information sets maintained by the storage nodes (Nd1, Nd2, Nd3, and Nd4) can keep relatively synchronized.

704. The storage node Nd1 instructs the storage node Nd2 to perform data reconstruction for the memory Nd2-D1.

It may be understood that the management node Nd1 may instruct, by sending the updated state information set, the storage node Nd2 to perform data reconstruction for the memory Nd2-D1; alternatively, the management node Nd1 may instruct, by using another message (for example, a data reconstruction notification message), the storage node Nd2 to perform data reconstruction for the memory Nd2-D1.

705. After the storage node Nd2 receives a notification of data reconstruction for the memory Nd2-D1 from the management node Nd1, the storage node Nd2 collects, from the storage node Nd3 and/or the storage node Nd4, a related reconstruction log generated during an offline period of the memory Nd2-D1.

706. The storage node Nd2 reconstructs data based on the collected related reconstruction log generated during the offline period of the memory Nd2-D1.

Specifically, for example, the storage node Nd2 collects a reconstruction log log 1 generated during the offline period of the memory Nd2-D1. The reconstruction log log 1 records a strip identifier of a strip (a data strip Pd1) that fails to be written during the offline period of the memory Nd2-D1, and a memory identifier of a memory (the memory Nd2-D1) into which a strip fails to be written during the offline period of the memory Nd2-D1. In addition, the reconstruction log log 1 may record a stripe identifier of a stripe to which the strip (the data strip Pd1) that fails to be written belongs, and the like.

The storage node Nd2 may determine, based on the stripe identifier of the stripe to which the data strip Pd1 belongs, the stripe to which the data strip Pd1 belongs, and obtain other strips (a data strip Pd2 and a parity strip Pj1) of the stripe to which the data strip Pd1 belongs. The storage node Nd2 performs a redundancy check operation based on the data strip Pd2 and the parity strip Pj1 to reconstruct the data strip Pd1. The storage node Nd2 writes the reconstructed data strip Pd1 into the memory Nd2-D1.

It may be understood that when the storage node Nd2 collects a plurality of related reconstruction logs generated during the offline period of the memory Nd2-D1, the storage node Nd2 may first perform deduplication on the plurality of collected reconstruction logs, and then separately perform data reconstruction based on each reconstruction log obtained after the deduplication. A manner of performing data reconstruction based on the reconstruction log may be the same as that described in the foregoing example.

707. After completing data reconstruction for the memory Nd2-D1, the storage node Nd2 sets the state of the memory Nd2-D1 to a trusted access state. Further, the storage node Nd2 may send a memory state change report P3 to the management node Nd1, where the memory state change report P3 may indicate that the state of the memory Nd2-D1 changes from the data reconstruction state to the trusted access state.

708. The management node Nd1 receives the memory state change report P3 from the storage node Nd2, and the management node Nd1 updates the cached state information set. Specifically, the storage node Nd1 updates the state that is of the memory Nd2-D1 and recorded in the state information set cached by the storage node Nd1 to the state that is of the memory Nd2-D1 and indicated by the memory state change report P3, and updates the version number recorded in the state information set.

For example, when a monitor is deployed in each storage node, specifically, a secondary monitor in the storage node Nd2 may send the memory state change report P3 to the management node Nd1. Correspondingly, a primary monitor in the management node Nd1 may receive the memory state change report P3 from the storage node Nd2.

For example, the state information set that has not been updated by the management node Nd1 is exemplified in FIG. 7-B. For example, the state information set that has been updated by the management node Nd1 is exemplified in FIG. 7-C. Certainly, in actual application, the state information set is not limited to such exemplified forms.

709. The management node Nd1 sends an updated state information set to other storage nodes (for example, Nd2, Nd3, and Nd4).

Correspondingly, the storage nodes Nd2, Nd3, and Nd4 may separately receive the updated state information set from the storage node Nd1. The storage nodes Nd2, Nd3, and Nd4 may separately use the state information set from the management node Nd1 to update their currently cached state information sets. In this way, the state information sets cached by the storage nodes (Nd1, Nd2, Nd3, and Nd4) can keep relatively synchronized as much as possible.

The foregoing solution is mainly used for a data reconstruction scenario after an offline memory goes online again, and the foregoing solution provides a possible data reconstruction mechanism in such a possible scenario. After a memory that is originally offline goes online again, a storage node of the memory notifies the management node. The management node updates a state that is of the memory and recorded in the management node to an "data reconstruction state", and then the management node releases a latest state information set to other storage nodes, to notify other storage nodes that the state of the memory has been updated into an "data reconstruction state". Subsequently, a related storage node reconstructs a strip that previously fails to be written into the memory. After reconstruction is completed, the storage node in which the memory that goes online again is located updates the state of the memory that goes online again to a "trusted access state", and instructs the management node to update the state of the memory that goes online again to a "trusted access state". Subsequently, the management node releases a latest state information set to other storage nodes again, to notify the remaining storage nodes that the state of the memory that goes online again has been updated into a "trusted access state".

In this embodiment, the state information set used for recording a memory state is introduced, and therefore the state information set may be used to record and manage access states of memories in the distributed storage system. This helps a storage node in the distributed storage system learn, in a relatively accurate manner, state switching (switching from an "offline state" to an "data reconstruction state" and then from the "data reconstruction state" to a "trusted access state") of a memory, helps reduce a failure probability of a read/write attempt, and helps improve system performance.

Embodiment 6

With reference to the related accompanying drawings, the following further uses an example to describe another data access method, which is mainly used for a possible scenario in which a terminal reads data from a distributed storage system. The data access method is applied to the distributed storage system. For example, the distributed storage system includes m storage nodes, and the m storage nodes include storage nodes Nd2, Nd1, Nd3, and Nd4. A memory Nd2-D1 belongs to the storage node Nd2, a memory Nd3-D1 belongs to the storage node Nd3, and a memory Nd4-D1 belongs to the storage node Nd4. This embodiment is described by using an example in which a format of a data body is a file.

Figure 8:
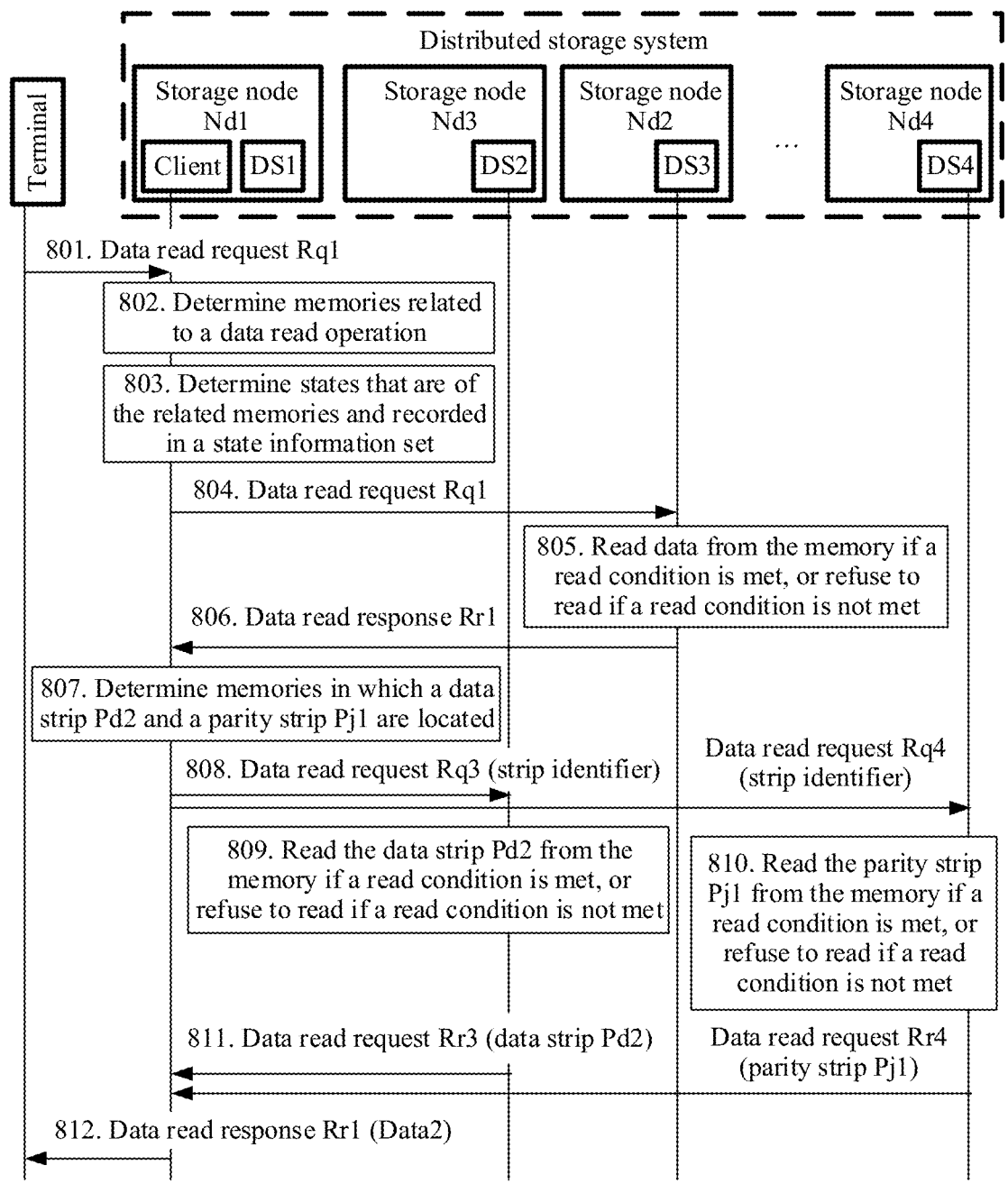
FIG. 8 is a schematic flowchart of another data access method exemplified according to an embodiment of this application.

Referring to FIG. 8, FIG. 8 is a schematic flowchart of a data access method according to an embodiment of this application. As shown in FIG. 8, a data access method provided in an embodiment of this application may include the following steps.

801. When the terminal needs to read data from the distributed storage system, the terminal sends a data read request to the distributed storage system. For convenience of the following description, the data read request is named Rq1 in this embodiment. In this step, for example, the storage node Nd1 in the distributed storage system receives the data read request Rq1 from the terminal.

For example, the data read request Rq1 carries a file identifier of a file to which data Data2 (the data Data2 is to-be-read data) belongs, and location information of the data Data2. The location information of the data Data2 is used to describe a location of the data Data2 in the file to which the data Data2 belongs. The location information of the data Data2 may include, for example, a file offset address of the data Data2 (the file offset address of the data Data2 indicates a start location or an end location of the data Data2 in the file), a length of the data Data2, and the like.

802. The storage node Nd1 determines, based on location information of data Data2, a memory in which the data Data2 is located.

For example, the storage node Nd1 determines that the memory in which the data Data2 is located is the memory Nd2-D1. For example, the file to which the Data2 belongs is divided into a plurality of data strips (and parity strips) during storage, one of the data strips is stored in the memory Nd2-D1, and the data Data2 is a fraction of this strip.

803. The storage node Nd1 determines a state that is of the memory Nd2-D1 and currently recorded in a state information set locally cached by the storage node Nd1. In this embodiment, the storage node Nd1 and a management node may be in a connected state, or may not be in a connected state.

For example, when the state information set currently cached by the storage node Nd1 records that the memory Nd2-D1 is in a trusted access state, step 804 is performed; or when the state information set currently maintained by the storage node Nd1 records that the memory Nd2-D1 is in a data reconstruction state or an offline state, step 807 is performed.

804. If it is determined that the memory Nd2-D1 is in a trusted access state, the storage node Nd1 may add, into the data read request Rq1, a version number of the state information set that is locally cached by the storage node Nd1 currently, to obtain an updated data read request Rq1, and the storage node Nd1 sends the updated data read request Rq1 to the storage node Nd2 to which the memory Nd2-D1 belongs.

That is, the updated data read request Rq1 may carry the version number of the state information set that is locally cached by the storage node Nd1 currently. Further, the data read request Rq1 may further carry the location information of the data Data2, the file identifier of the file to which the data strip Pd2 belongs, and the like.

It may be understood that the storage node Nd1 adds, into a data read request sent to another storage node, the version number of the state information set cached by the storage node Nd1, mainly to help the another storage node verify, by comparing version numbers, whether the state information set cached by the storage node Nd1 is valid.

805. After receiving the data read request Rq1 from the storage node Nd1, the storage node Nd2 may compare the version number of the state information set carried in the data read request Rq1 with a version number of a state information set currently maintained by the storage node Nd2.

If it is determined by comparison that the version number of the state information set carried in the data read request Rq1 is the same as the version number of the state information set currently cached by the storage node Nd2, and the storage node Nd2 and the management node are in a connected state (that is, a secondary monitor in the storage node Nd2 is normally connected to a primary monitor in the management node, and in this case, it may be considered that there is an extremely high probability that the state information set currently cached by the storage node Nd2 is a latest version of the state information set maintained by the primary monitor), the storage node Nd2 may read the data Data2 from the memory Nd2-D1. Alternatively, if it is determined by comparison that the version number of the state information set carried in the data read request Rq1 is different from the version number of the state information set currently cached by the storage node Nd2, the storage node Nd2 may refuse to read data from the memory Nd2-D1. Alternatively, if the storage node Nd2 and the management node are not in a connected state (that is, a secondary monitor in the storage node Nd2 is not normally connected to a primary monitor in the management node, and in this case, it may be considered that the state information set currently cached by the storage node Nd2 may be a latest version of the state information set maintained by the primary monitor, or may not be a latest version of the state information set maintained by the primary monitor), the storage node Nd2 may refuse to read data from the memory Nd2-D1. Certainly, in some scenarios of a relatively low verification level, it is also possible that regardless of whether the storage node Nd2 and the management node are in a connected state, provided that the version number of the state information set carried in the data request Rq1 is the same as the version number of the state information set currently cached by the storage node Nd2, the storage node Nd2 can read the data Data2 from the memory Nd2-D1.

When the storage node Nd2 successfully reads the data Data2 from the memory Nd2-D1, the storage node Nd2 sends a data read response Rr1 used for responding to the data read request Rq1 to the storage node Nd1, where the data read response Rr1 carries the read data Data2. When the storage node Nd2 fails to read the data Data2 from the memory Nd2-D1 (for example, the storage node Nd2 refuses to read data from the memory Nd2-D1), the data read response Rr1 may carry a result of a read operation (the result of the read operation is a read failure).

806. The storage node Nd1 receives a data read response Rr1 from the storage node Nd2, and if the storage node Nd2 successfully reads the data Data2, the storage node Nd1 may obtain the data Data2 from the data read response Rr1.

The storage node Nd1 sends the data read response Rr1 used for responding to the data read request Rq1 to the terminal, where the data read response Rr1 carries the data Data2. Then this procedure ends.

807. If it is determined that the memory Nd2-D1 is in an untrusted access state, the storage node Nd1 determines a data strip Pd1 to which the data Data2 belongs, and the storage node Nd1 determines a stripe to which the data strip Pd1 belongs, where the stripe includes the data strip Pd1, a data strip Pd2, and a parity strip Pj1. The storage node Nd1 determines memories in which the data strip Pd2 and the parity strip Pj1 are located.

For example, a memory in which the data strip Pd2 is located is denoted as the memory Nd3-D1, and a storage node to which the memory Nd3-D1 belongs is denoted as the storage node Nd3. For example, a memory in which the parity strip Pj1 is located is denoted as the memory Nd4-D1, and a storage node to which the memory Nd4-D1 belongs is denoted as the storage node Nd4.

In this step, the memory in which the strip to which the to-be-read data Data2 belongs is located is in an untrusted access state. Therefore, in this step, the storage node Nd1 that receives the read request determines the memories in which the remaining strips of the stripe are located, so as to subsequently use the remaining strips to restore, by using a check algorithm, the strip in which the Data2 is located, and obtain the Data2.

808. The storage node Nd1 sends a data read request Rq3 to the storage node Nd3 to which the memory Nd3-D1 belongs, and the storage node Nd1 sends a data read request Rq4 to the storage node Nd4 to which the memory Nd4-D1 belongs.

For example, the data read request Rq3 carries a strip identifier of the data strip Pd2 and the version number of the state information set currently cached by the storage node Nd1. Further, the data read request Rq3 may further carry a length of the data strip Pd2 (the length is, for example, 110 Kb or another length), a file offset address of the data strip Pd2, a stripe identifier of the stripe to which the data strip Pd2 belongs, and the file identifier of the file to which the data strip Pd2 belongs, and even may further carry a segment identifier of a file segment to which the data strip Pd2 belongs.

For example, the data read request Rq4 carries a strip identifier of the parity strip Pj1 and the version number of the state information set that is locally cached by the storage node Nd1 currently. Further, the data read request Rq4 may further carry a length of the parity strip Pj1, a stripe identifier of the stripe to which the parity strip Pj1 belongs, and the like.

809. After receiving the data read request Rq3 from the storage node Nd1, the storage node Nd3 compares a version number of the state information set carried in the data read request Rq3 with a version number of a state information set currently cached by the storage node Nd3. If it is determined by comparison that the version number of the state information set carried in the data read request Rq3 is the same as the version number of the state information set currently cached by the storage node Nd3, and the storage node Nd3 and the management node are in a connected state (that is, a secondary monitor in the storage node Nd3 is normally connected to a primary monitor in the management node, and in this case, it may be considered that the state information set currently cached by the storage node Nd3 is a latest version of the state information set maintained by the primary monitor; the version number of the state information set carried in the data read request Rq3 is the same as the version number of the state information set currently cached by the storage node Nd3, that is, the state information set currently cached by the storage node Nd1 is also the latest version of the state information set maintained by the primary monitor; in this case, a state (trusted access state) that is of the memory Nd3-D1 and recorded in the state information set currently cached by the storage node Nd1 is also accurate), the storage node Nd3 reads the data strip Pd2 from the memory Nd3-D1. Alternatively, if it is determined by comparison that the version number of the state information set carried in the data read request Rq3 is different from the version number of the state information set currently maintained by the storage node Nd3, the storage node Nd3 may refuse to read the data strip Pd2 from the memory Nd3-D1.

Further, the storage node Nd3 sends a data read response Rr3 used for responding to the data read request Rq3 to the storage node Nd1. The data read response Rr3 carries a result of a read operation on the data strip Pd2. Specifically, when the storage node Nd3 successfully reads the data strip Pd2 from the memory Nd3-D1, the result of the read operation carried in the data read response Rr3 is a read success, and the data read response Rr3 carries the data strip Pd2. When the storage node Nd3 fails to read the data strip Pd2 from the memory Nd3-D1 (for example, the storage node Nd3 refuses to read the data strip Pd2 from the memory Nd3-D1), the result of the read operation carried in the data read response Rr3 is a read failure.

810. After receiving the data read request Rq4 from the storage node Nd1, the storage node Nd4 performs an operation (for example, comparing state information set versions and sending a data read response Rr4 to the storage node Nd1) that is similar to that performed by the storage node Nd3. Reference may be made to step 809 for this step, and therefore details are not described herein.

811. The storage node Nd1 receives the data read response Rr3 from the storage node Nd3, and the storage node Nd1 receives the data read response Rr4 from the storage node Nd4.

Further, if a data read response indicates a corresponding read failure, the storage node Nd1 may resend a corresponding data read request to request a re-read. For example, if the data read response Rr3 indicates a corresponding read failure, the storage node Nd1 may resend the data read request to the storage node Nd3 to request again to read the data strip Pd2. For another example, if the data read response Rr4 indicates a corresponding read operation failure, the storage node Nd1 may resend the data read request Rq4 to request again to read the parity strip Pj1; and so on.

812. When the storage node Nd1 obtains the data strip Pd2 and the parity strip Pj1, the storage node Nd1 performs a check operation by using the data strip Pd2 and the parity strip Pj1, to obtain the data strip Pd1 and obtain the data Data2 from the data strip Pd1. The storage node Nd1 sends the data read response Rr1 used for responding to the data read request Rq1 to the terminal, where the data read response Rr1 carries the data Data2.

When the storage node Nd1 obtains the data Data2 from the data read response Rr1 from the storage node Nd2, the storage node Nd1 sends the data read response Rr1 used for responding to the data read request Rq1 to the terminal, where the data read response Rr1 carries the data Data2.

It can be learned that, in the foregoing solution, the state information set used for recording a memory state is introduced into the distributed storage system, and therefore the state information set may be used to record and manage access states of the memories in the distributed storage system. Specifically, a mechanism is introduced as follows: A storage node that receives a data read request makes a corresponding data read decision based on a result of comparison between a version number that is of a state information set and carried in the data read request and a version number that is of a state information set currently cached by the storage node. Version number comparison helps better determine validity of the used state information set. For a memory that is found by means of verification to be in a trusted access state, requested data can be directly read from the memory and fed back to the terminal. In such a case of trusted access, complex steps in a conventional manner of reading all strips of a related stripe and then performing a correctness check are not required, and a data read amount is reduced, thereby helping reduce memory load and further helping improve system performance.

This embodiment describes a method for reading to-be-read data, and the to-be-read data is a fraction of a strip or an entire strip. If a storage node in which the strip is located is trusted, the to-be-read data is directly returned to a device (a terminal or a host) that sends a request. If a storage node in which the strip is located is untrusted (in a reconstruction state or an offline state), a check operation is performed by using other strips (strips other than a strip to which the to-be-read data belongs) of a stripe to which the to-be-read data belongs, so as to obtain the strip to which the to-be-read data belongs and obtain the to-be-read data from the strip.

The storage node Nd1 adds, into a data read request sent to another storage node, the version number of the state information set cached by the storage node Nd1, mainly to help the another storage node verify, by comparing version numbers, whether the state information set cached by the storage node Nd1 is valid. When the storage node Nd2 is normally connected to the management node, in this case, if the version number of the state information set carried in the data request Rq1 is the same as the version number of the state information set currently cached by the storage node Nd2, it may be considered that the storage nodes Nd1 and Nd2 cache a same latest state information set, and the storage node Nd2 can read the data Data2 from the memory Nd2-D1. Alternatively, when the storage node Nd2 is not normally connected to the management node, in this case, it may be considered that the state information set currently cached by the storage node Nd2 may be the latest version of the state information set released by the management node, or may not be the latest version of the state information set released by the management node. It is difficult to determine validity of the state information set currently cached by the storage node Nd2, and therefore the storage node Nd2 may refuse to read the data Data2 from the memory Nd2-D1. Certainly, in some scenarios of a relatively low verification level, it is also possible that regardless of whether the storage node Nd2 and the management node are in a connected state, provided that the version number of the state information set carried in the data request Rq1 is the same as the version number of the state information set currently cached by the storage node Nd2 (when the two version numbers are the same, there is a relatively high probability that the state information set cached by the storage node Nd1 is valid), the storage node Nd2 can read the data Data2 from the memory Nd2-D1. Some mechanisms for verifying validity of a state information set are introduced, and therefore this helps better determine validity of the used state information set.

Embodiment 7

With reference to the accompanying drawings, the following further describes another data access method. The data access method is applied to a distributed storage system. For example, the distributed storage system includes m storage nodes, and the m storage nodes include storage nodes Nd1, Nd2, Nd3, and Nd4. A memory Nd2-D1 belongs to the storage node Nd2. This embodiment is described by using an example in which a data body is a file.

Figure 9:
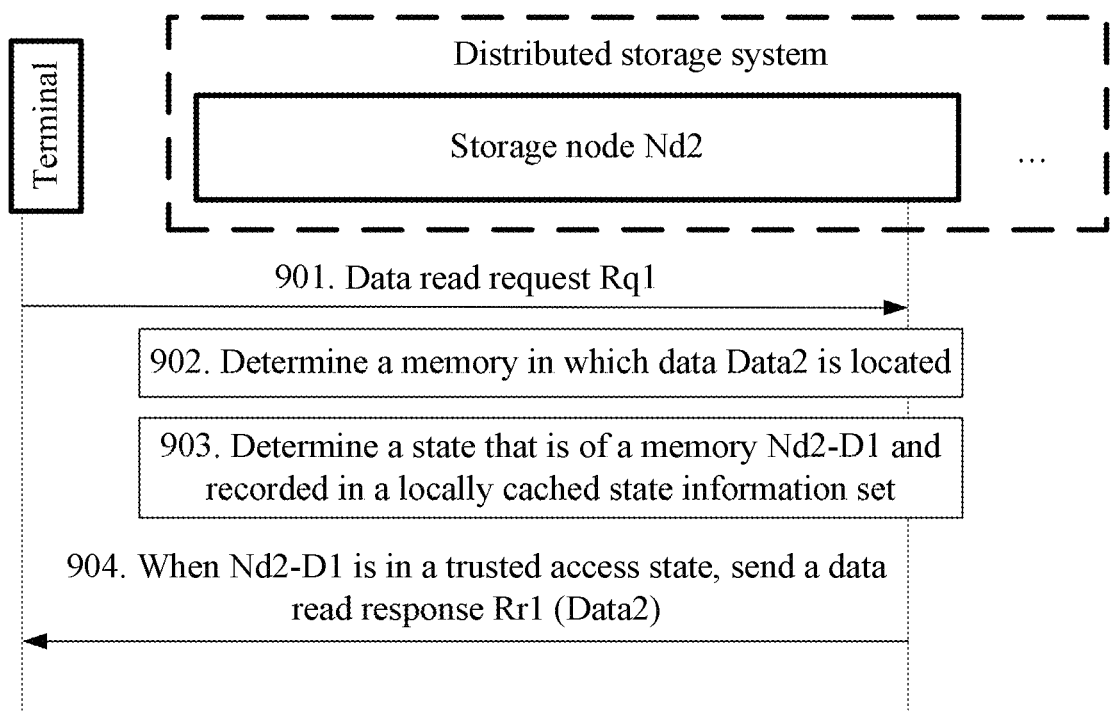
FIG. 9 is a schematic flowchart of another data access method exemplified according to an embodiment of this application.

Referring to FIG. 9, FIG. 9 is a schematic flowchart of another data access method according to another embodiment of this application. As shown in FIG. 9, another data access method provided in another embodiment of this application may include the following steps.

901. When a terminal needs to read data from the distributed storage system, the terminal may send a data read request to the distributed storage system. For convenience of the following description, the data read request is named Rq1 in this embodiment. In this step, for example, the storage node Nd2 in the distributed storage system receives the data read request Rq1 from the terminal.

For example, related information carried in the data read request Rq1 in step 901 is the same as the related information carried in the data read request Rq1 in step 801.

902. The storage node Nd2 determines, based on location information of data Data2, a memory in which the data Data2 is located. A solution of determining, according to location information, a memory in which data is located is already described in other embodiments, and therefore is not described herein again.

For example, the storage node Nd2 determines that the memory in which the data Data2 is located is the memory Nd2-D1.

903. The storage node Nd2 determines a state that is of the memory Nd2-D1 and recorded in a state information set locally cached by the storage node Nd2.

For example, the state information set currently cached by the storage node Nd2 records that the memory Nd2-D1 is in a trusted access state, and the storage node Nd2 and a management node are in a connected state (that is, a secondary monitor in the storage node Nd2 is normally connected to a primary monitor in the management node, and in this case, it may be considered that the state information set currently cached by the storage node Nd2 is a latest version of a state information set released by the primary monitor).

904. If it is determined that the memory Nd2-D1 is in a trusted access state, the storage node Nd2 may read the data Data2 from the memory Nd2-D1, and the storage node Nd2 sends a data read response Rr1 used for responding to the data read request Rq1 to the terminal, where the data read response Rr1 carries the data Data2.

Alternatively, when it is determined that the memory Nd2-D1 is in an untrusted access state, reference may be made to the implementation in the scenario exemplified in FIG. 8: collecting other strips of a stripe to which the data Data2 belongs, and obtaining the Data2 by using the other strips. Details about a specific implementation are not described herein again.

It can be learned that, in the foregoing solution, the state information set used for recording a memory state is introduced into the distributed storage system, and therefore the state information set may be used to record and manage access states of the memories in the distributed storage system. Specifically, a mechanism is introduced as follows: A storage node that receives a data read request makes a corresponding data read decision based on a state that is of a related memory and recorded in a state information set cached by the storage node, and a status of connection between the storage node and the management node that releases the state information set. This helps better determine validity of the used state information set. For a memory that is found by means of verification to be in a trusted access state, requested data can be directly read from the memory and fed back to the terminal. In such a case of trusted access, complex steps in a conventional manner of reading all strips of a related stripe and then performing a correctness check are not required, and a data read amount is reduced, thereby helping reduce memory load and further helping improve system performance.

In this solution, if the to-be-read data (the data Data2) is located in the memory (ND2-D1) of the storage node (Nd2) that receives the data read request from the terminal/host, and the storage node (Nd2) and the management node are in a connected state, it may be considered that a memory state recorded in the state information set locally cached by the storage node (Nd2) is relatively reliable. When the state information set records that the memory (Nd2-D1) is in a trusted access state, the to-be-read data (the data Data2) can be directly read from the memory, and then returned to the terminal/host.

Embodiment 8

With reference to the accompanying drawings, the following further describes another data access method. The data access method is applied to a distributed storage system. For example, the distributed storage system includes m storage nodes, and the m storage nodes include storage nodes Nd2, Nd1, Nd3, and Nd4. A memory Nd2-D1 belongs to the storage node Nd2, a memory Nd3-D1 belongs to the storage node Nd3, and a memory Nd4-D1 belongs to the storage node Nd4. This embodiment is described by using an example in which a data body is a file.

Figure 10:
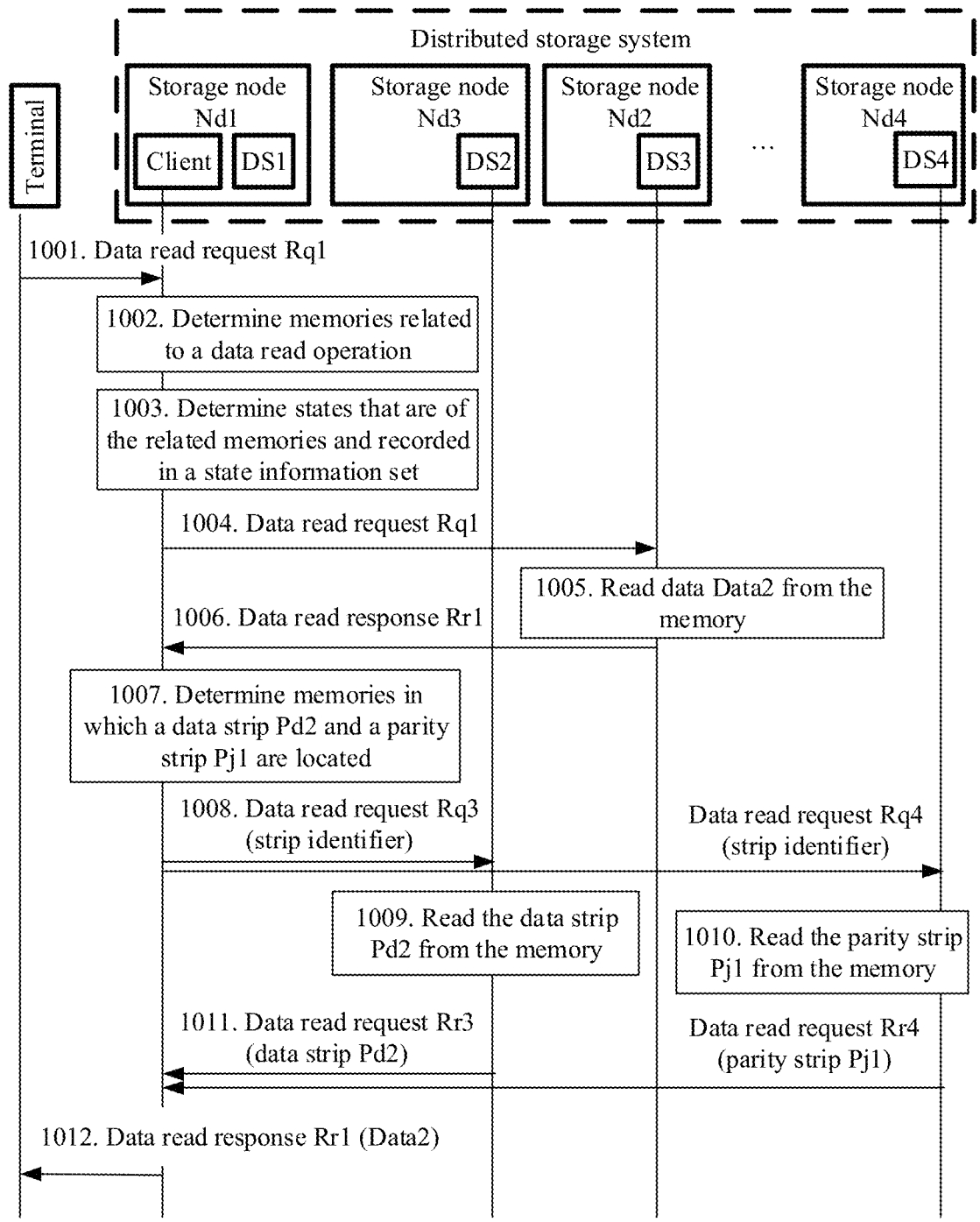
FIG. 10 is a schematic flowchart of another data access method exemplified according to an embodiment of this application.

Referring to FIG. 10, FIG. 10 is a schematic flowchart of another data access method according to another embodiment of this application. As shown in FIG. 10, another data access method provided in another embodiment of this application may include the following steps.

1001 and 1002. Steps 1001 and 1002 are the same as steps 801 and 802. Therefore, for related descriptions, refer to corresponding steps 801 and 802, and details are not described herein again.

1003. When the storage node Nd1 and a management node are in a connected state, the storage node Nd1 determines a state that is of the memory Nd2-D1 and recorded in a state information set locally cached by the storage node Nd1.

For example, when the state information set currently cached by the storage node Nd1 records that the memory Nd2-D1 is in a trusted access state, step 1004 is performed; or when the state information set currently maintained by the storage node Nd1 records that the memory Nd2-D1 is in a data reconstruction state or an offline state, step 1007 is performed.

When the storage node Nd1 and the management node are not in a connected state, the storage node Nd1 may forward a data read request Rq1 to the management node, or forward the data read request Rq1 to another storage node that is in a state of being connected to the management node, and the another storage node that receives Rq1 determines a state that is of the memory Nd2-D1 and recorded in a state information set locally cached by the another storage node, and performs subsequent related operations according to the state of the memory Nd2-D1. For details about the subsequent operations, refer to steps 1003 to 1011 in this embodiment. In this embodiment, a case in which the storage node Nd1 and the management node are in a connected state is used as an example for description.

1004. If it is determined that the memory Nd2-D1 is in a trusted access state, the storage node Nd1 sends a data read request Rq1 to the storage node Nd2 to which the memory Nd2-D1 belongs.

1005. After the storage node Nd2 receives the data read request Rq1 from the storage node Nd1, the storage node Nd2 may read data Data2 from the memory Nd2-D1. The storage node Nd2 further sends a data read response Rr1 used for responding to the data read request Rq1 to the storage node Nd1, where the data read response Rr1 carries the read data Data2.

1006. The storage node Nd1 receives the data read response Rr1 from the storage node Nd2, and if the storage node Nd2 successfully reads the data Data2, the storage node Nd1 may obtain the data Data2 from the data read response Rr1. After this step is performed, the procedure ends, and the following step 1007 and other steps are no longer performed.

1007. If it is determined that the memory Nd2-D1 is in an untrusted access state, the storage node Nd1 determines a data strip Pd1 to which the data Data1 belongs, and the storage node Nd1 determines a stripe to which the data strip Pd1 belongs, where the stripe includes the data strip Pd1, a data strip Pd2, and a parity strip Pj1. The storage node Nd1 determines memories in which the data strip Pd2 and the parity strip Pj1 are located.

For example, a memory in which the data strip Pd2 is located is denoted as the memory Nd3-D1, and a storage node to which the memory Nd3-D1 belongs is denoted as the storage node Nd3. For example, a memory in which the parity strip Pj1 is located is denoted as the memory Nd4-D1, and a storage node to which the memory Nd4-D1 belongs is denoted as the storage node Nd4. The storage node Nd1 determines states that are of the memories Nd3-D1 and Nd4-D1 recorded in the state information set locally cached by the storage node Nd1.

That the state information set currently cached by the storage node Nd1 records that the memories Nd3-D1 and Nd4-D1 are in a trusted access state is used as an example for the following description. When the state information set currently maintained by the storage node Nd1 records that the memories Nd3-D1 and Nd4-D1 are in an untrusted access state, a data read failure may be directly fed back, or states that are of the memories Nd1-D1, Nd3-D1, and Nd4-D1 and recorded in the currently cached state information set are checked again after specified duration.

1008. The storage node Nd1 sends a data read request Rq3 to the storage node Nd3 to which the memory Nd3-D1 belongs, and the storage node Nd1 sends a data read request Rq4 to the storage node Rq4 to which the memory Nd4-D1 belongs.

For example, the data read request Rq3 carries a strip identifier of the data strip Pd2. The data read request Rq3 may further carry a length (for example, 110 Kb) of the data strip Pd2, a file offset address of the data strip Pd2, a stripe identifier of the stripe to which the data strip Pd2 belongs, and a file identifier of a file to which the data strip Pd2 belongs, and even may further carry a segment identifier of a file segment to which the data strip Pd2 belongs.

For example, the data read request Rq4 carries a strip identifier of the parity strip Pj1. Further, the data read request Rq4 may further carry a length of the parity strip Pj1, a stripe identifier of the stripe to which the parity strip Pj1 belongs, and the like.

1009. After the storage node Nd3 receives the data read request Rq3 from the storage node Nd1, the storage node Nd3 reads the data strip Pd2 from the memory Nd3-D1.

Further, the storage node Nd3 sends a data read response Rr3 used for responding to the data read request Rq3 to the storage node Nd1. The data read response Rr3 carries a result of a read operation on the data strip Pd2. Specifically, when the storage node Nd3 successfully reads the data strip Pd2 from the memory Nd3-D1, the result of the read operation carried in the data read response Rr3 is a read success, and the data read response Rr3 carries the data strip Pd2. When the storage node Nd3 fails to read the data strip Pd2 from the memory Nd3-D1, the result of the read operation carried in the data read response Rr3 is a read failure.

1010. After the storage node Nd4 receives the data read request Rq4 from the storage node Nd1, the storage node Nd4 reads the parity strip Pj1 from the memory Nd4-D1.

Further, the storage node Nd4 sends a data read response Rr4 used for responding to the data read request Rq4 to the storage node Nd1. The data read response Rr4 carries a result of a read operation on the parity strip Pj1. Specifically, when the storage node Nd4 successfully reads the parity strip Pj1 from the memory Nd4-D1, the result of the read operation carried in the data read response Rr4 is a read success, and the data read response Rr4 carries the parity strip Pj1. When the storage node Nd4 fails to read the parity strip Pj1 from the memory Nd4-D1, the result of the read operation carried in the data read response Rr4 is a read failure.

Steps 1011 and 1012 are the same as steps 811 and 812.

In this embodiment, a storage node (Nd1) receives the read request, but the data (the data Data1) that needs to be read is located in a memory (Nd2-D1) of another storage node (Nd2). If Nd2 and the management node are in a connected state, and the state that is of the memory Nd2-D1 and recorded in the state information set locally cached by Nd2 is a trusted access state, the data that needs to be read can be directly read from Nd2-D1. If Nd2 and the management node are not in a connected state, memories (Nd3-D1 and Nd4-D1) in which strips (the data stripe Pd2 and the parity stripe Pj1) located in other memories are located are determined, where the stripes are in a strip in which the data that needs to be read is located. If the memories (Nd3-D1 and Nd4-D1) in which the strips (the data stripe Pd2 and the parity stripe Pj1) located in other memories are located are in a trusted access state, and the storage nodes to which the memories Nd3-D1 and Nd4-D1 belong and the management node are in a connected state, the stripes located in other memories are read, a strip (Pd2) in which the data (the data Data1) that needs to be read is located is obtained by using a check algorithm, and the data (the data Data1) that needs to be read is obtained from Pd1 and returned to a terminal/host.

It can be learned that, in the foregoing solution, the state information set used for recording a memory state is introduced into the distributed storage system, and therefore the state information set may be used to record and manage access states of the memories in the distributed storage system. Specifically, a mechanism is introduced as follows:

a storage node that receives and transfers a data read request makes a corresponding data read request transfer decision based on a state that is of a related memory and recorded in a released state information set cached by the storage node, and a status of a connection between the storage node and the management node that releases the state information set. This helps better determine validity of the used state information set. For a memory in a trusted access state, a related storage node can be directly triggered to read requested data from the memory and send the read data to the terminal. In such a case of trusted access, complex steps in a conventional manner of reading all strips of a related stripe and then performing a correctness check are not required, and a data read amount is reduced, thereby helping reduce memory load and further helping improve system performance.

The following further provides related apparatuses for implementing the foregoing solutions.

Figure 11:
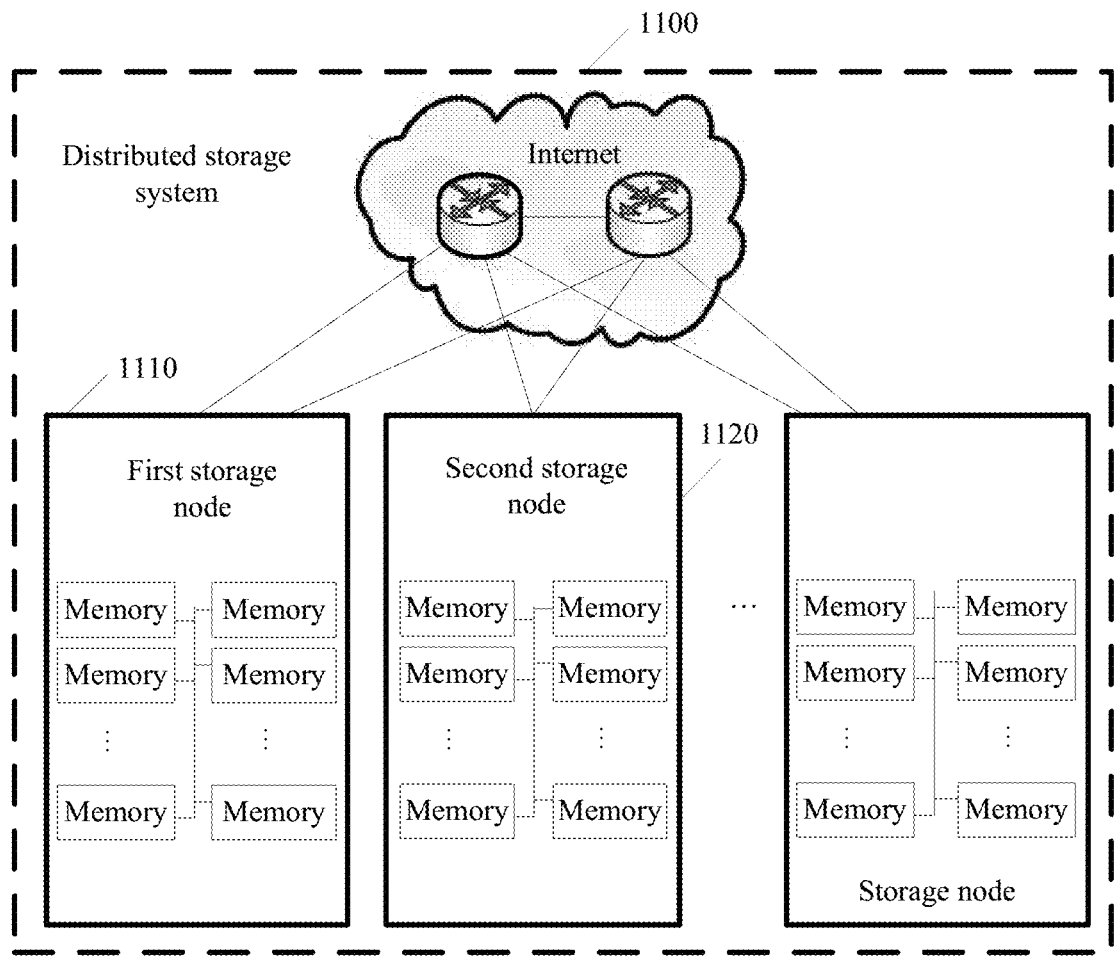
FIG. 11 is a schematic diagram of a distributed storage system exemplified according to an embodiment of this application.

Referring to FIG. 11, an embodiment of this application provides a distributed storage system 1100. The distributed storage system includes m storage nodes, each storage node includes at least one memory, each memory includes a non-volatile storage medium, and m is an integer greater than 1. A first storage node 1110 in the m storage nodes is configured to: receive a first data read request from a terminal, where the first data read request carries first location information, and the first location information is used to describe a location of first data in a data body to which the first data belongs; and determine, based on the first location information, a first memory in which the first data is located; and if the first memory belongs to the first storage node, when a state information set currently records that the first memory is in a trusted access state, read the first data from the first memory, and send a first data read response used for responding to the first data read request to the terminal, where the first data read response carries the read first data. The first data is, for example, a part or all of data in a strip to which the first data belongs.

In some possible implementations of this application, the distributed storage system further includes a management node that is configured to release a state information set.

The first storage node is further configured to: if the first memory belongs to a second storage node in the m storage nodes, the first memory is in a trusted access state, and the first storage node and the management node that is configured to release a state information set are in a connected state, forward the first data read request to the second storage node.

The second storage node 1120 is configured to: after receiving the first data read request from the first storage node, read the first data from the first memory, and send the first data read response used for responding to the first data read request to the first storage node or the terminal, where the first data read response carries the read first data.

In some possible implementations of this application, the first storage node 1110 is further configured to: if the first memory belongs to a second storage node in the m storage nodes, and the first memory is in a trusted access state, add, into the first data read request, an identifier of the state information set currently cached by the first storage node, and send, to the second storage node, the first data read request into which the identifier of the state information set is added.

The second storage node 1120 is configured to: after receiving the first data read request from the first storage node, compare the identifier of the state information set carried in the first data read request with an identifier of a state information set currently cached by the second storage node, and if it is determined by comparison that the identifier of the state information set carried in the first data read request is the same as the identifier of the state information set currently cached by the second storage node, read the first data from the first memory, and send the first data read response used for responding to the first data read request to the first storage node or the terminal, where the first data read response carries the read first data.

In some possible implementations of this application, the first storage node 1110 is further configured to: if the first memory belongs to a second storage node in the m storage nodes, and the first memory is in a trusted access state, add, into the first data read request, an identifier of the state information set currently cached by the first storage node and a node identifier of a management node that is configured to release a state information set, and send, to the second storage node, the first data read request into which the identifier of the state information set and the node identifier of the management node are added.

Correspondingly, the second storage node 1120 is configured to: after receiving the first data read request from the first storage node, compare the identifier of the state information set carried in the first data read request with an identifier of a state information set currently cached by the second storage node, compare the node identifier of the management node carried in the first data read request with a node identifier that is of the management node and currently cached by the second storage node, and if it is determined by comparison that the identifier of the state information set carried in the first data read request is the same as the identifier of the state information set currently cached by the second storage node, and it is determined by comparison that the node identifier of the management node carried in the first data read request is the same as the node identifier that is of the management node and currently cached by the second storage node, read the first data from the first memory, and send the first data read response used for responding to the first data read request to the first storage node or the terminal, where the first data read response carries the read first data.

In some possible implementations of this application, the first storage node 1110 is further configured to: if it is determined that the first memory is in an untrusted access state, x memories in N memories in which strips of a stripe to which the first data belongs are located belong to the first storage node, and N-x memories in the N memories belong to y storage nodes different from the first storage node, send, to the y storage nodes, a data read request that carries a stripe identifier of the stripe and an identifier of the state information set.

Each of the y storage nodes is configured to: after receiving the data read request from the first storage node, compare the identifier of the state information set carried in the data read request with an identifier of a state information set currently cached by the storage node, and if it is determined by comparison that the identifier of the state information set carried in the data read request is the same as the identifier of the state information set currently cached by the storage node, read a corresponding strip of the stripe from a corresponding memory included in the storage node, and send the read corresponding strip of the stripe to the first storage node.

The first storage node is further configured to: perform, based on strips of the stripe that are collected from the y storage nodes and the first storage node, a check operation to obtain the first data, and send the first data read response used for responding to the first data read request to the terminal, where the first data read response carries the obtained first data.

In some possible implementations of this application, for example, one of the m storage nodes is the management node. The first storage node is further configured to: when a state of the first memory changes from a first state to a second state, send a memory state change report to the management node, where the memory state change report indicates that the first memory is in the second state, the first state is different from the second state, and the first state and the second state each include any one of the following states: an offline state, a data reconstruction state, or a trusted access state.

The management node is configured to: after receiving the memory state change report from the first storage node, update a state that is of the first memory and recorded in a state information set cached by the management node into the second state, and update a version number of the state information set cached by the management node; and the management node sends an updated state information set to a storage node other than the management node in the m storage nodes.

Correspondingly, the first storage node is further configured to use the state information set from the management node to update the state information set currently cached by the first storage node. Correspondingly, another storage node also uses the state information set from the management node to update a state information set currently cached by the another storage node.

In some possible implementations of this application, the first storage node is further configured to receive a first data write request from the terminal, where the first data write request carries second data and second location information, and the second location information is used to describe a location of the second data in a data body to which the second data belongs.

The first storage node is further configured to: determine, based on the second location information, W memories related to writing the second data, segment the second data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: when the state information set cached by the first storage node currently records that W1 memories in the W memories are in a non-offline state and that W2 memories in the W memories are in an offline state, send, to y2 storage nodes to which the W1 memories belong, a data write request that carries a strip of the stripe and the identifier of the state information set.

Correspondingly, each of the y2 storage nodes is configured to: after receiving the data write request from the first storage node, compare the identifier of the state information set carried in the data write request with an identifier of a state information set currently cached by the storage node, and if it is determined by comparison that the identifier of the state information set carried in the data write request is the same as the identifier of the state information set currently cached by the storage node, write a corresponding strip of the stripe into a corresponding memory included in the storage node, or if it is determined by comparison that the identifier of the state information set carried in the data write request is different from the identifier of the state information set currently cached by the storage node, refuse to write a corresponding strip of the stripe into a corresponding memory included in the storage node.

In some possible implementations of this application, the first storage node is further configured to receive a second data write request from the terminal, where the second data write request carries third data and third location information, and the third location information is used to describe a location of the third data in a data body to which the third data belongs.

The first storage node is further configured to: after determining, based on the third location information, W memories related to writing the third data, segment the third data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: determine states that are of the W memories and currently recorded in the state information set cached by the first storage node, and if it is determined that W1 memories in the W memories are in a non-offline state (and, for example, W2 memories in the W memories are in an offline state), and the first storage node and the management node that is configured to release a state information set are in a connected state, send, to y2 storage nodes to which the W1 memories belong, a data write request that carries a strip of the stripe.

Correspondingly, each of the y2 storage nodes is configured to: after receiving the data write request from the first storage node, write a corresponding strip of the stripe into a corresponding memory included in the storage node.

In some possible implementations of this application, the first storage node is further configured to receive a third data write request from the terminal, where the third data write request carries fourth data and fourth location information, and the fourth location information is used to describe a location of the fourth data in a data body to which the fourth data belongs.

The first storage node is further configured to: determine, based on the fourth location information, W memories related to writing the fourth data, segment the fourth data into W-T data strips, and obtain T parity strips by means of calculation by using the W-T data strips, where the T parity strips and the W-T data strips form a stripe including W strips, the W memories are in a one-to-one correspondence with the W strips, T and W are positive integers, and T is less than W.

The first storage node is further configured to: if the state information set cached by the first storage node currently records that W1 memories in the W memories are in a non-offline state (and, for example, W2 memories in the W memories are in an offline state), and the first storage node and the management node that is configured to release a state information set are in a connected state, send, to y2 storage nodes to which the W1 memories belong, a data write request that carries a strip of the stripe and a node identifier of the management node that is configured to release a state information set.

Correspondingly, each of the y2 storage nodes is configured to: after receiving the data write request from the first storage node, compare the node identifier of the management node carried in the data write request with a node identifier that is of the management node and currently cached by the storage node, and if it is determined by comparison that the node identifier of the management node carried in the data write request is the same as the node identifier that is of the management node and currently cached by the storage node, write a corresponding strip of the stripe into a corresponding memory included in the storage node, or if it is determined by comparison that the node identifier of the management node carried in the data write request is different from the node identifier that is of the management node and currently cached by the storage node, refuse to write a corresponding strip of the stripe into a corresponding memory included in the storage node.

In some possible implementations of this application, the first storage node is further configured to generate a first reconstruction log, where the first reconstruction log records a memory identifier of a second memory in the W2 memories, the first reconstruction log further records a strip identifier of a first strip that corresponds to the second memory in the W strips, the first reconstruction log further records the stripe identifier of the stripe, and the second memory is any memory in the W2 memories.

Correspondingly, for example, after the second memory in the W2 memories goes online again, and the second storage node to which the second memory belongs collects the first reconstruction log generated during an offline period of the second memory, the second storage node obtains the identifier, recorded in the first reconstruction log, of the first strip that needs to be written into the second memory; and determines W-T memories in which W-T strips other than the first strip that are included in the stripe are located, reads the W-T strips from the W-T memories, performs a check operation by using the W-T strips to reconstruct the first strip that needs to be written into the second memory, and writes the reconstructed first strip into the second memory.

It may be understood that functions of the distributed storage system 1100 in this embodiment may be implemented based on the solutions in the foregoing method embodiments. For some parts that are not described, refer to the foregoing embodiments.

Figure 12:
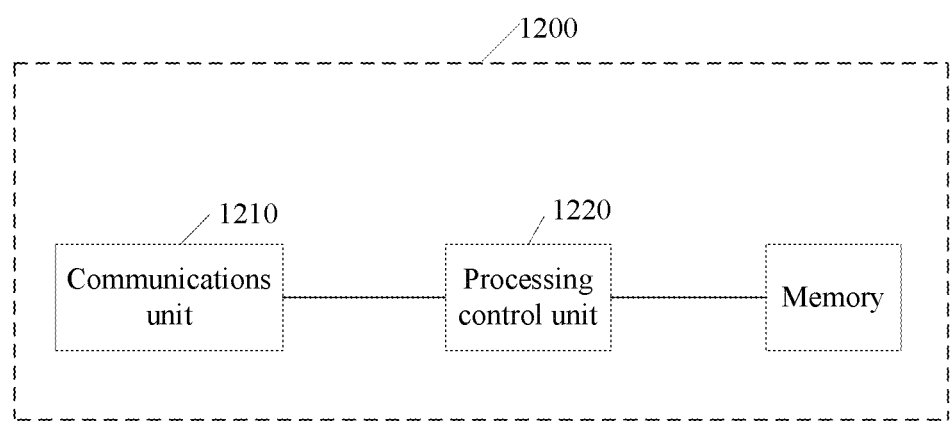
FIG. 12 is a schematic diagram of a storage node exemplified according to an embodiment of this application.

Referring to FIG. 12, an embodiment of this application further provides a storage node 1200. The storage node is one of m storage nodes included in a distributed storage system, each storage node includes at least one memory, each memory includes a non-volatile storage medium, and m is an integer greater than 1. The storage node includes a communications unit and a processing control unit.

The communications unit 1210 is configured to receive a first data read request from a terminal, where the first data read request carries first location information, and the first location information is used to describe a location of first data in a data body to which the first data belongs.

The processing control unit 1220 is configured to: if it is determined, based on the first location information, that a memory in which the first data is located is a first memory, and the first memory belongs to the storage node, when a state information set currently records that the first memory is in a trusted access state, read the first data from the first memory.

The communications unit 1210 is further configured to send a first data read response used for responding to the first data read request to the terminal, where the first data read response carries the read first data.

In some possible implementations of this application, the communications unit 1210 is further configured to: if the first memory belongs to a second storage node in the m storage nodes, the first memory is in a trusted access state, and the storage node and a management node that is configured to release a state information set are in a connected state, forward the first data read request to the second storage node.

The first data read request is used to trigger the second storage node to: after receiving the first data read request from the first storage node, read the first data from the first memory, and send the first data read response used for responding to the first data read request to the storage node or the terminal, where the first data read response carries the read first data.

In some possible implementations of this application, the communications unit is further configured to: if the first memory belongs to a second storage node in the m storage nodes, and the first memory is in a trusted access state, add, into the first data read request, an identifier of the state information set currently cached by the first storage node, and send, to the second storage node, the first data read request into which the identifier of the state information set is added.

The first data read request is used to trigger the second storage node to: after receiving the first data read request from the storage node, compare the identifier of the state information set carried in the first data read request with an identifier of a state information set currently cached by the second storage node, and if it is determined by comparison that the identifier of the state information set carried in the first data read request is the same as the identifier of the state information set currently cached by the second storage node, read the first data from the first memory, and send the first data read response used for responding to the first data read request to the storage node or the terminal, where the first data read response carries the read first data.

In some possible implementations of this application, one of the m storage nodes is the management node.

The communications unit is further configured to: when a state of the first memory changes from a first state to a second state, send a memory state change report to the management node, where the memory state change report indicates that the first memory is in the second state, the first state is different from the second state, and the first state and the second state each include any one of the following states: an offline state, a data reconstruction state, or a trusted access state.

The memory state change report is used to trigger the management node to: after receiving the memory state change report from the first storage node, update a state that is of the first memory and recorded in a state information set cached by the management node into the second state, update a version number of the state information set cached by the management node, and send an updated state information set to a storage node other than the management node in the m storage nodes.

The processing control unit is configured to use the state information set from the management node to update the state information set currently cached by the storage node.

It may be understood that functions of the storage node 1200 in this embodiment may be specifically implemented based on the solutions in the foregoing method embodiments. For some parts that are not described, refer to the foregoing embodiments.

Figure 13:
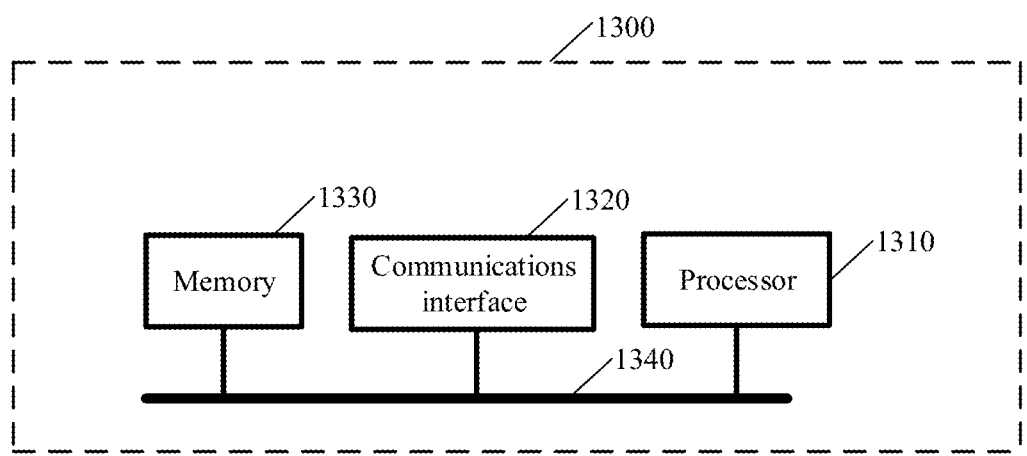
FIG. 13 is a schematic diagram of another storage node exemplified according to an embodiment of this application.

Referring to FIG. 13, an embodiment of this application provides a storage node 1300. The storage node is one of m storage nodes included in a distributed storage system, each storage node includes at least one memory, each memory includes a non-volatile storage medium, and m is an integer greater than 1.

The storage node includes a processor 1310 and a communications interface 1320 that are coupled to each other. The processor is configured to perform some or all of the steps of the method performed by a first storage node or another storage node in each of the foregoing method embodiments.

A memory 1330 is configured to store an instruction and data; the processor 1310 is configured to execute the instruction; and the communications interface 1320 is configured to communicate with another device under control of the processor 1310. When executing the instruction, the processor 1310 can perform, according to the instruction, some or all of the steps performed by any storage node in any method in the foregoing embodiments of this application.

The processor 1310 is also referred to as a central processing unit (English: Central Processing Unit, CPU for short). In specific application, components of the storage node are coupled together, for example, by using a bus system. In addition to a data bus, the bus system may include a power bus, a control bus, a status signal bus, and the like. However, for clarity of description, various buses are denoted as the bus system 1340 in the figure. The method disclosed in the foregoing embodiment of this application may be applied to the processor 1310 or implemented by the processor 1310. The processor 1310 may be an integrated circuit chip and has a signal processing capability. In an implementation process, the steps of the foregoing method may be completed by using an integrated logic circuit of hardware in the processor 1310 or an instruction in a form of software. The foregoing processor 1310 may be a general purpose processor, a digital signal processor, an application-specific integrated circuit, a field programmable gate array or another programmable logic component, a discrete gate or a transistor logic component, or a discrete hardware component. The processor 1310 may implement or perform methods, steps, and logical block diagrams disclosed in the embodiments of this application. The general purpose processor 1310 may be a microprocessor, or the processor may be any conventional processor, or the like. The steps of the method disclosed with reference to the embodiments of this application may be directly performed and completed by using a hardware decoding processor, or performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1330. For example, the processor 1310 can read information from the memory 1330, and complete the steps of the foregoing method in combination with the hardware.

For example, the processor 1310 is configured to: receive a first data read request by using the communications interface 1320, where the first data read request carries first location information, and the first location information is used to describe a location of first data in a data body to which the first data belongs; and if it is determined, based on the first location information, that a memory in which the first data is located is a first memory, and the first memory belongs to the first storage node, when a state information set currently records that the first memory is in a trusted access state, read the first data from the first memory, and send, by using the communications interface, a first data read response used for responding to the first data read request, where the first data read response carries the read first data.

An embodiment of this application provides a computer readable storage medium. The computer readable storage medium stores program code. The program code includes an instruction used to perform some or all of the steps of the method performed by any storage node (for example, a first storage node or a second storage node) in the first aspect.

In addition, an embodiment of this application provides a computer program product including an instruction. When the computer program product runs on a computer (the computer is, for example, a storage node), the computer performs some or all of the steps of the method performed by any storage node (for example, a first storage node or a second storage node) in the foregoing embodiments.

In addition, an embodiment of this application further provides a service system, including a distributed storage service system and a terminal. The distributed storage service system and the terminal are communicatively connected. The distributed storage service system is any distributed storage service system provided in the embodiments of this application.

All or some of the foregoing embodiments may be implemented by means of software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state disk), or the like. In the foregoing embodiments, the descriptions of the embodiments have respective focuses. For a part that is not described in detail in an embodiment, reference may be made to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification are all example embodiments, and the related actions and modules are not necessarily required by this application.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer accessible memory. Based on such an understanding, the technical solutions of this application essentially, or the part contributing to the prior art, or all or some of the technical solutions may be implemented in the form of a software product. The computer software product is stored in a memory and includes requests for instructing a computer device (which may be a personal computer, a server, or a network device, and may be specifically a processor in a computer device) to perform all or some of the steps of the foregoing methods described in the embodiments of this application.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data accessing method performed by a first storage node, in a distributed storage system including a plurality of storage nodes and a management node, wherein each of the storage nodes includes storage devices, the method comprising:
   receiving a first data read request for reading first data, wherein the first data read request includes a first address of the first data;
   determining, based on the first address, that the first data is stored in a first storage device of the first storage node;
   determining, in accordance with the determining that the first data is stored in the first storage device, that the first storage device is in a trusted access state indicating that the first storage device is online and not in a reconstruction process; and
   obtaining, in accordance with determining that the first storage device is in the trusted access state, the first data.

2. The method according to claim 1, wherein the first storage node stores a first system map recording a state of each of all storage devices in the distributed storage system, and
   wherein the determining that the first storage device is in the trusted access state comprises searching the first system map for a state of the first storage device.

3. The method according to claim 2, wherein the distributed storage system further includes a management node storing a local map, the method further comprising:
   after obtaining the first data, determining, by the first storage node, that the first storage device has left the trusted access state;
   sending, by the first storage node, a status change message to the management node, wherein the status change message indicates that the first storage device is not in the trusted access state;
   modifying, by the management node, a state of the first storage device recorded in the local map;
   updating, by the management node, a version ID of the local map; and
   sending, by the management node, the modified local map with the updated version ID to each of the plurality of storage nodes.

4. The method according to claim 2, wherein the plurality of storage nodes includes a second node including a second storage device, and the first system map has a version ID, and
   wherein the method further comprises:
   receiving a second data read request for reading second data, wherein the second data read request includes a second address of the second data;
   determining, based on the second address, that the second data is stored in the second storage device of the second node;
   attaching the version ID of the first system map to the second data read request to generate a modified second data read request;
   forwarding the modified second data read request to the second storage node to indicate to the second storage node to carry out the further operations of:
      comparing the version ID included in the modified second data read request to a version ID of a second system map stored in the second storage node;
      obtaining the second data from the second storage device in accordance with determining, based on the comparing, that the version ID included in the second data read request is the same as the version ID of the second system map; and
      sending the second data to the first storage node.

5. A first storage node, configured to carry out a data accessing method in a distributed storage system including a plurality of storage nodes and a management node, wherein each of the storage nodes includes storage devices, and wherein the first storage node comprises:
   a processor; and
   a non-transitory computer-readable medium including computer-executable instructions that, when executed by the processor, cause the first storage node to perform the data access method, comprising:
      receiving a first data read request for reading first data, wherein the first data read request includes a first address of the first data;
      determining, based on the first address, that the first data is stored in a first storage device of the first storage node;
      determining, in accordance with the determining that the first data is stored in the first storage device, that the first storage device is in a trusted access state indicating that the first storage is online and not in a reconstruction process; and obtaining, in accordance with determining that the first storage device is in the trusted access state, the first data.

6. The first storage node according to claim 5, wherein the first storage node stores a first system map recording a state of each of all storage devices in the distributed storage system, and wherein the determining that the first storage device is in the trusted access state comprises searching the first system map for a state of the first storage device.

7. The distributed storage system according to claim 6, further comprising a management node storing a local map, wherein the first storage device is further configured to:

after obtaining the first data, determine that the first storage device has left the trusted access state; and send a status change message to the management node, wherein the status change message indicates that the first storage device is not in the trusted access state, wherein the management node is configured to:

modify a state of the first storage device recorded in the local map;

update a version ID of the local map; and send the modified local map with the updated version ID to each of the plurality of storage nodes.

8. A first storage node, configured to carry out a data accessing method in a distributed storage system including a plurality of storage nodes and a management node, wherein each of the storage nodes includes storage devices, and wherein the first storage node comprises:

a processor; and a non-transitory computer-readable medium including computer-executable instructions that, when executed by the processor, cause the first storage node to perform the data access method, comprising:

receiving a first data read request for reading first data from a terminal, wherein the first data read request includes a first address of the first data;

determining, based on the first address, that the first data is stored in a first storage device of the first storage node;

determining, in accordance with the determining that the first data is stored in the first storage device, that the first storage device is in a trusted access state indicating that the first storage device is online and not in a reconstruction process; and obtaining, in accordance with determining that the first storage device is in the trusted access state, the first data, wherein the first storage node stores a first system map recording a state of each of all storage devices in the distributed storage system, wherein the determining that the first storage device is in a trusted access state comprises:

searching the first system map for a state of the first storage device, wherein the plurality of storage nodes includes a second node including a second storage device, and the first system map has a version ID, and wherein the method further comprises:

receiving a second data read request for reading second data, wherein the second data read request includes a second address of the second data;

determining, based on the second address, that the second data are stored in the second storage device of the second node;

attaching the version ID of the first system map to the second data read request to generate a modified second data read request;

forwarding the modified second data read request to the second storage node to indicate to the second storage node to carry out the further operations of:

comparing the version ID included in the modified second data read request to a version ID of a second system map stored in the second storage node;

obtaining the second data from the second storage device in accordance with determining, based on the comparing, that the version ID included in the second data read request is the same as the version ID of the second system map; and sending the second data to the first storage node.

* * * * *

UNITED STATES PATENT AND TRADEMARK OFFICE
CERTIFICATE OF CORRECTION

| | |
|---|---|
| PATENT NO. | : 11,307,776 B2 |
| APPLICATION NO. | : 16/574421 |
| DATED | : April 19, 2022 |
| INVENTOR(S) | : Yang |

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Twenty-first Day of November, 2023

Katherine Kelly Vidal
*Director of the United States Patent and Trademark Office*